United States Patent
Henning et al.

(10) Patent No.: US 12,244,742 B2
(45) Date of Patent: Mar. 4, 2025

(54) COMPUTER-IMPLEMENTED DIGITAL COMMUNICATION USING CRYPTOGRAPHY

(71) Applicant: Citizens Reserve, Inc., Los Gatos, CA (US)

(72) Inventors: Lucas Henning, Miami, FL (US); Addison David McKenzie, San Francisco, CA (US); Yonathan Lapchik, Miami, FL (US)

(73) Assignee: Citizens Reserve, Inc., Los Gatos, CA (US)

( * ) Notice: Subject to any disclaimer, the term of this patent is extended or adjusted under 35 U.S.C. 154(b) by 459 days.

(21) Appl. No.: 17/843,661

(22) Filed: Jun. 17, 2022

(65) Prior Publication Data
US 2023/0198785 A1    Jun. 22, 2023

Related U.S. Application Data

(60) Provisional application No. 63/301,579, filed on Jan. 21, 2022, provisional application No. 63/293,038, filed on Dec. 22, 2021.

(51) Int. Cl.
| | | |
|---|---|---|
| *H04L 9/00* | (2022.01) | |
| *G06Q 20/06* | (2012.01) | |
| *H04L 9/32* | (2006.01) | |
| *H04W 4/14* | (2009.01) | |

(52) U.S. Cl.
CPC ............. *H04L 9/50* (2022.05); *H04W 4/14* (2013.01); *G06Q 20/065* (2013.01); *H04L 9/3236* (2013.01); *H04L 2209/56* (2013.01)

(58) Field of Classification Search
CPC ..... H04L 9/3236; H04L 9/50; H04L 2209/56; G06Q 20/065; G06Q 2220/00; H04W 4/14

See application file for complete search history.

(56) References Cited

U.S. PATENT DOCUMENTS

| | | | | |
|---|---|---|---|---|
| 10,043,174 | B1* | 8/2018 | Chikkanna | G06Q 20/3676 |
| 2017/0293899 | A1* | 10/2017 | Furche | H04L 9/3213 |
| 2021/0248594 | A1* | 8/2021 | Yantis | G06Q 20/123 |
| 2021/0319433 | A1 | 10/2021 | Yantis et al. | |
| 2022/0188781 | A1* | 6/2022 | El-Bizri | G06Q 20/3678 |

OTHER PUBLICATIONS

International Search Report and Written Opinion received in Application No. PCT/US22/34067, dated Dec. 29, 2022, 19 pages.
Ray, Arin, "Turn Picture Messages Into NFTs with Twilio MMS and NFTPort," In: medium.com, Nov. 11, 2021, [online] [retrieved on Nov. 29, 2022] Retrieved from the Internet.
Spaven, E., "Coinbase enables users to buy, sell and send bitcoins via text message," Aug. 16, 2013, https ://www.coindesk.com/ markets/2013/08/16/ coinbase-ena bles-use rs-to-buy-sell-a nd-send-bitcoins-via-text-m essage/.

* cited by examiner

*Primary Examiner* — Jeremy S Duffield

(74) *Attorney, Agent, or Firm* — Perkins Coie LLP

(57) ABSTRACT

Computer-implemented digital communication using cryptography is disclosed. The computer-implemented methods are used to perform digital communication for minting and transfer of digital commodities using short message service (SMS) messages. The cryptographic system disclosed generates graphical user interfaces and executes operations on a backend apparatus. When the backend apparatus receives the SMS messages, the backend apparatus retrieves the digital commodities and interacts with a storage apparatus to store the digital commodities, identified by a uniform resource locator (URL).

16 Claims, 14 Drawing Sheets

| COMMAND | DESCRIPTION |
|---|---|
| RECEIVE | Show public Etherum address |
| BALANCE | Show the balance of the user's wallet |
| TRANSFER | Transfer ETH or fungible token |
| SWAP | Swap currencies (e.g., using Uniswap) |
| LOAN | Get a decentralized loan (e.g., using SUKU's DeFi protocol) |
| NFT TRANSFER | Transfer an NFT to another wallet |
| NFT BALANCE | Show NFTs owned by the user |

*FIG. 2*

COMPUTER-IMPLEMENTED DIGITAL COMMUNICATION USING CRYPTOGRAPHY

CROSS-REFERENCE TO RELATED APPLICATION(S)

This application claims the benefit of U.S. Provisional Patent Application No. 63/293,038, filed Dec. 22, 2021, and U.S. Provisional Patent Application No. 63/301,579, filed Jan. 21, 2022, both of which are incorporated by reference in their entireties herein.

TECHNICAL FIELD

The present disclosure is generally related to storage of cryptographic tokens.

BACKGROUND

A cryptocurrency is a digital currency designed to work as a medium of exchange through a computer network that is not reliant on any central authority to uphold or maintain it. Ownership records are stored in a digital ledger, which is a computerized database using cryptography to secure transaction records, to control the creation of additional coins, and to verify the transfer of coin ownership. When a cryptocurrency is generated prior to issuance or issued by a single issuer, it is generally considered centralized. When implemented with decentralized control, each cryptocurrency works through distributed ledger technology, typically a blockchain, that serves as a public financial transaction database. Cryptocurrencies use encryption to authenticate and protect transactions.

BRIEF DESCRIPTION OF THE DRAWINGS

FIG. 2 is a table illustrating example instructions for minting and transfer of NFTs, in accordance with one or more embodiments.

DETAILED DESCRIPTION

Figure 1:
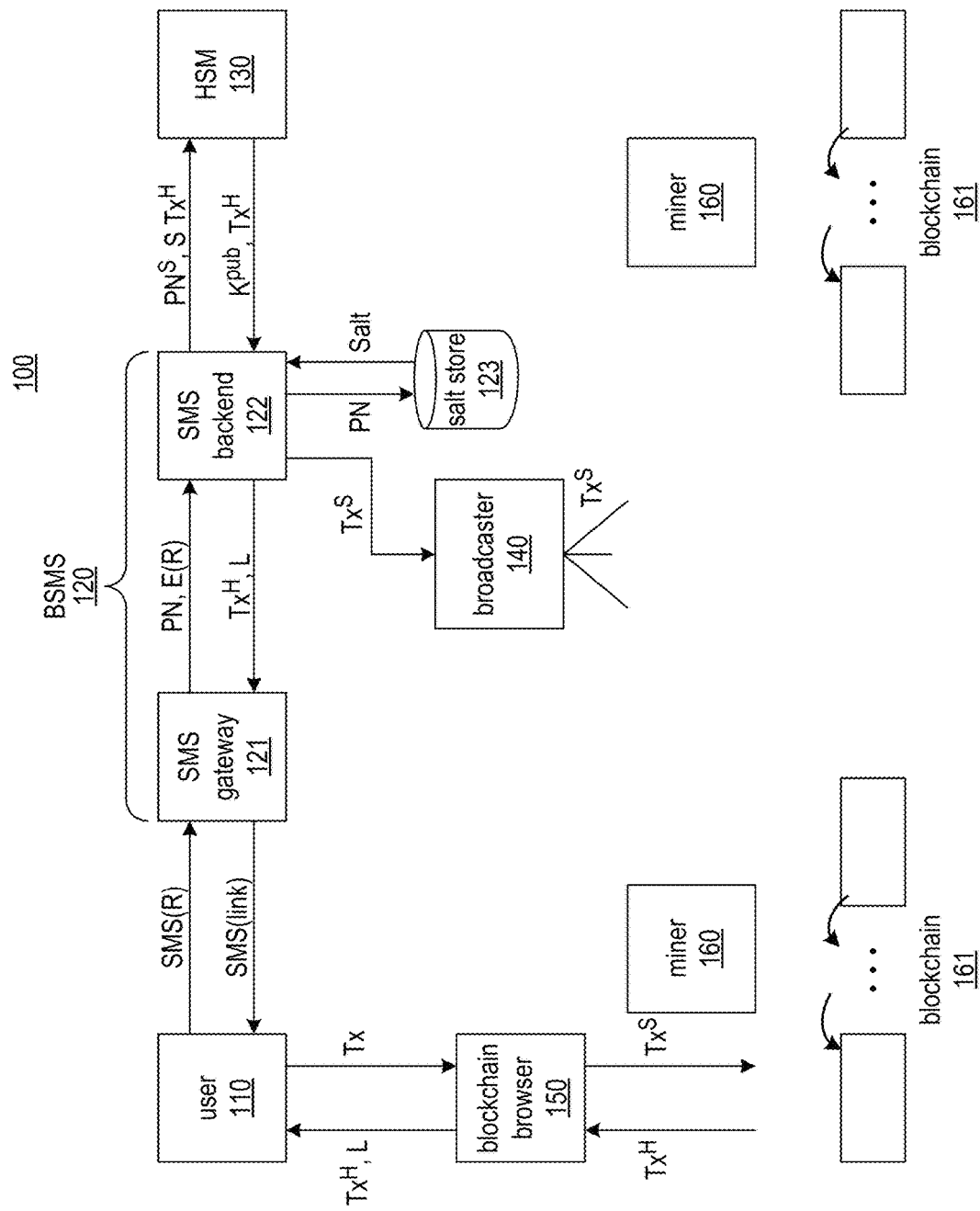
FIG. 1 is a block diagram illustrating an example system for minting and transfer of non-fungible tokens (NFTs) using short message service (SMS), in accordance with one or more embodiments.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "160") can implement components, operations, or structures (e.g., "160a") described as a single instance. Further, plural instances (e.g., "160") refer collectively to a set of components, operations, or structures (e.g., "160a") described as a single instance. The description of a single component (e.g., "160a") applies equally to a like-numbered component (e.g., "160b") unless indicated otherwise. These and other aspects, features, and implementations can be expressed as methods, apparatuses, systems, components, program products, means, or steps for performing a function, and in other ways. These and other aspects, features, and implementations will become apparent from the following descriptions, including the claims.

The Bitcoin™ system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (a digital cryptographic coin) is part of a system commonly known as a cryptocurrency system and is a fungible token. Non-fungible cryptographic tokens or NFTs represent assets that are non-fungible. For example, an NFT is generated for a piece of digital art, music, images, videos, and so on. An NFT can also represent a physical article (e.g., a Renoir painting). A standard for NFTs is defined by ERC-721™ for the Ethereum™ blockchain. Other blockchains have NFT standards such as Hedera HIP-17™ or Tezos FA2™.

The embodiments disclosed herein describe methods, apparatuses, and systems for minting and transfer of digital assets such as cryptocurrency or NFTs using messaging services. Although described primarily in the context of an SMS system, the methods and systems of the blockchain short message service (BSMS) architecture can be used with other types of instant messaging and chat systems such as WhatsApp™, Google+Hangouts™, Google Talk™, Apple Messages™, Multimedia Messaging Service (MMS)™ Facebook Messenger™, and so on. In embodiments, minting, transferring, and searching for NFTs is performed via SMS text messages by generating a user interface and a backend apparatus for accessing the NFTs. An NFT-SMS system enables minting an NFT by providing an SMS user interface for minting that is initiated by a "mint" instruction. The SMS user interface transmits and receives SMS messages that enable specification of a location where a digital asset is stored, a name of and description for the digital asset, and other metadata. When the backend apparatus receives the SMS messages, the backend apparatus retrieves the digital asset and interacts with a storage apparatus to store the digital asset, identified by a uniform resource locator (URL). The backend apparatus generates and stores a cryptographic operation (e.g., an NFT transaction) that references the NFT owner and identifies the digital asset using a token identifier.

In embodiments, a method performed by one or more computing systems to transfer an NFT from a sender to a recipient includes receiving a transfer request that identifies the NFT, the sender's phone number, and the recipient's blockchain address. Using the sender's phone number, a cryptographic operation (e.g., a transaction) that transfers the NFT to the sender is generated. A cryptographic operation (e.g., a transfer transaction) is created to transfer the NFT from the sender to the recipient's blockchain address. A hardware security module (HSM) is requested to sign a hash of the cryptographic operation (e.g., the transfer transaction) with a private key associated with the sender's phone number, and recording of the operation (e.g., the transfer transaction) in the blockchain is initiated.

The advantages and benefits of the methods, systems, and apparatuses disclosed herein include creating trust between different entities where trust is either nonexistent or unproven. The embodiments facilitate transactions among entities that do not have direct relationships. The disclosed methods for transferring NFTs reduce the amount of repeated or duplicated effort in authenticating digital collectibles, digital art, and products, thereby saving valuable resources required for performing such activities. The embodiments provide methods for digital artists and other NFT providers or consumers to partner together, such that a digital artist or other NFT provider can benefit from digital transactions, increasing opportunities and reaching a wider audience. The embodiments disclosed herein provide a more transparent, efficient, and accessible solution that connects creators, collectors, businesses, and consumers.

Among other benefits, the disclosed systems provide a decentralized structure that enables sharing of data within an ecosystem of businesses where no single entity is exclusively in charge. The enhanced security results from the unalterable record of transactions with end-to-end encryption, which prevents fraud and unauthorized activity. Additionally, data on the blockchain is stored across a network of computers, making it more difficult to hack (unlike conventional computer systems that store data together in servers). Furthermore, the disclosed embodiments address privacy concerns better than traditional computer systems by anonymizing data and requiring permissions to limit access. The disclosed mechanisms create efficiencies in processing transactions by reducing manual tasks, such as aggregating and amending data, as well as easing reporting and auditing processes.

The disclosed methods execute transactions faster than conventional methods. In some cases, the blockchain can handle a transaction in seconds or less. The digital asset transactions, once recorded on the blockchain, cannot be changed or deleted. The transactions are timestamped and date-stamped to generate a permanent record. The methods can be used to track information over time, enabling a secure, reliable audit of information in contrast to error-prone paper-based filing and legacy computer systems that could be corrupted or retired. The advantages of the convolutional neural network (CNN) used for ML in the disclosed embodiments include the obviation of feature extraction and the use of shared weight in convolutional layers, which means that the same filter (weights bank) is used for each node in the layer. The weights bank both reduces memory footprint and improves performance.

FIG. 1 is a block diagram illustrating an example system 100 for minting and transfer of NFTs using SMS, in accordance with one or more embodiments. The system 100 is used to implement a BSMS architecture. The system 100 includes a user device 110, a BSMS system 120, an HSM 130, a broadcaster 140, a blockchain browser 150, and crypto-miner devices 160. The BSMS system 120 includes an SMS gateway 121, an SMS backend 122, and a salt store 123. The arrows between the blocks indicate data flow for creating a cryptographic operation (e.g., a transfer transaction) to transfer a digital asset (e.g., a cryptocurrency or an NFT). Although described primarily in the context of an SMS system, the methods and systems of the BSMS architecture can be used with other types of instant messaging and chat systems such as WhatsApp™, Google+Hangouts™, Google Talk™, Apple Messages™, Multimedia Messaging Service (MMS) TM, Facebook Messenger™, and so on. The system 100 is implemented using the components of the example computer system 1400 illustrated and described in more detail with reference to FIG. 14. Likewise, embodiments of the system 100 can include different and/or additional components or can be connected in different ways.

In embodiments, the user device 110 is a smartphone, laptop, tablet, etc., operating a BSMS application (that can be considered to be part of the BSMS system 120) for generating an SMS message including a request R to generate a cryptographic operation (e.g., a transfer transaction Tx) to transfer a digital asset from a sender or owner 408 to a recipient. An example owner 408 is referenced by FIG. 4. The sender or recipient can be a computer device, a digital account, an organization, a person, any other entity, or a combination thereof. The cryptographic transfer transaction Tx is stored in a blockchain 161 (e.g., Ethereum, Hedera, Tezos, Binance, Solana, etc.). The request R identifies an input transaction to the cryptographic transfer transaction Tx and can identify a recipient phone number to which (ownership of) the digital asset is to be transferred. In embodiments, the user device 110 sends the request R in an SMS message to the SMS gateway 121. In embodiments, the BSMS system 120 uses the recipient phone number to access a recipient blockchain address maintained by the recipient, generates the cryptographic transfer transaction Tx, and uses a sender phone number to access the sender's private cryptographic key to sign the cryptographic transfer transaction Tx. For example, the recipient phone number is used to look up the recipient blockchain address. The cryptographic transfer transaction Tx is recorded in a blockchain 161.

In embodiments, the SMS gateway 121 signs the request R using a secret key shared with the SMS backend 122 to generate a signed transaction $R^S$ and sends the signed transaction $R^S$ and a phone number PN of the user device 110 (derived from the SMS message) as a Transport Layer Security (TLS) encrypted HTTPS request $E(R^S)$ and encrypted phone number $E(PN)$ to the SMS backend 122. The SMS backend 122 decrypts $E(R^S)$ and $E(PN)$ to extract $R^S$ and PN and checks the signature of $R^S$ using the shared secret key. The SMS backend 122 generates the cryptographic transfer transaction Tx based on the request R and retrieves an encryption salt S associated with the phone number PN from the salt store 123. The salt S is random data, a random number, or a random vector that is used as an additional input to a one-way function that hashes data, a password, or passphrase.

In embodiments, the salt store 123 stores a mapping of phone numbers to the associated salt. If the salt store 123 does not already store a salt for the phone number PN, the SMS backend 122 generates the salt S and stores the phone number PN and salt S in the salt store 123. The SMS backend 122 signs the phone number PN using a secret key shared with the HSM 130 (established during an initialization phase) to generate a signed phone number $PN^S$ and generates a hash of the transaction $Tx^H$. The SMS backend 122 sends the signed phone number $PN^S$, the salt S, and the hash $Tx^H$ of the transaction Tx to the HSM 130. In embodiments, the HSM 130 stores a pepper associated with each phone number. A pepper is a secret key added to an input such as a password during hashing with a cryptographic hash function. The pepper is not stored alongside a password hash, but rather the pepper is kept separate in the HSM 130. In such embodiments, the SMS backend 122 would not store or send the salt S to the HSM 130.

The HSM 130 is a secure cryptographic device that performs cryptographic functions including generating public/private keypairs. Although the BSMS system 120 is described primarily in the context of the HSM 130, the BSMS system 120 can be used with other technology that provides functionality similar to that of the HSM 130, such as Intel's Software Guard Extension (SGX)™. When the HSM 130 receives the signed phone number $PN^S$, salt S, and the hash of the transaction, the HSM 130 checks the signature of the signed phone number using the secret key shared with the SMS backend 122. The HSM 130 generates a seed using a password-based key derivation function (PBKDF2) based on the signed phone number and the salt (or pepper). The HSM 130 generates a public/private keypair using an elliptic curve digital signature algorithm (ECDSA) with the seed as input. The HSM 130 transforms the public/private key pair into a blockchain (e.g., Ethereum) compatible public/private keypair KPUB/KPRIV and stores the private key in association with the phone number. As explained in more detail herein, not every ECDSA keypair is a valid blockchain keypair. The HSM 130 signs the hash of the transaction using the private key to generate a signature $Tx^S$ for the transaction. The HSM 130 sends the signed transaction and public key to the SMS backend 122.

In embodiments, the system 100 performs key management by signing an Ethereum™ transaction using Amazon's Key Management Services-Amazon Web Services™ (AWS KMS). The system 100 generates an Ethereum™ transaction signed with a key held by Amazon™. The key is held within Amazon's™ infrastructure, enabling enterprise-level security, including the ability to use FIPS 140-2 certified hardware security modules for Ethereum™ transactions. For example, the following implementation can be used to manage cryptographic keys.

Similar to Bitcoin™, Ethereum™ uses an ECDSA. More specifically, the elliptic curve being used for transaction signing is secp256k1. AWS KMS offers the ECC_SECG_P256K1 key spec used for ECDSA secp256k1 signatures. A new asymmetric key pair is generated in KMS. Steps in the KMS key configuration wizard are performed to obtain a key pair ID. For example, after setup, the public key can be retrieved using the KMS part of the AWS SDK. The result is the ECDSA public key (a string of hexadecimal numbers).

The Ethereum address is determined. The retrieved public key from AWS is not an Ethereum address. To resolve to an address, the DER-encoded public key is decoded and the Ethereum address is determined. To decode the public key, prior to determining the Ethereum address, the raw value of the public key is retrieved. For example, the getPublicKey( ) function returns a DER-encoded X.509 public key, also known as SubjectPublicKeyInfo (SPKI), as defined in Amazon's RFC 5280. The SubjectPublicKeyInfo format is defined in section 2 of RFC 5480.

In embodiments, an ASN1 library is used to define the process as a schema. The result is a hexadecimal bit string. According to section 2.2 of RFC 5480, the first byte, 0x04 indicates that the result is an uncompressed key. The first byte for the public key is removed. Once the first byte is deleted, the raw public key can be used to calculate the Ethereum address. The address is the last 20 bytes of the keccak256 hash of the public key. Using the Ethereum address, the cryptographic transaction can be signed. The signing process can be divided into separate steps. First, a keccak256 hash of the message is signed using AWS KMS. The DER-encoded signature is decoded. The values of r and s are determined. The value of v is determined to complete the Ethereum signature.

In embodiments, the MessageType: 'DIGEST' in the KMS.SignRequest is specified to prevent AWS from re-hashing the payload, which could generate an invalid signature. The payload is a keccak256 hash of the transaction object. An empty keccak256 hash can be signed that will be passed to the function as msgHash. To decode the signature, the kms.sign( ) returns a DER-encoded object as defined by ANS X9.62-2005. A parse function according to section 2.2.3 of RFC 3279 is used. The function expects to find two integers r and s in the signature that will be returned as two BigNumber (BN.js) objects. The result represents a point on the elliptic curve where r represents the x coordinate and s represents y.

In embodiments, to determine the Ethereum signature, according to EIP-2, enabling transactions with any s value (from 0 to the max number on the secp256k1n curve), can cause a transaction malleability concern. Hence, a signature with a value of s>secp256k1n/2 (greater than half of the curve) is invalid (i.e., it is a valid ECDSA signature but from an Ethereum perspective, the signature is not preferred). The embodiments disclosed herein address the issue by checking if the value of s is greater than secp256k1n/2 (line 21). If so, s is inverted in order to get a valid Ethereum signature. The value of s does not define a distinct point on the curve. The value can be +s or −s, either signature is valid from an ECDSA perspective.

In embodiments, the system 100 determines the v value for a valid Ethereum signature. The value of v is the recovery ID and it can be one of two possible values: 27 or 28. The value v is typically created during Ethereum's signing process and stored alongside the signature. Using Ethereum's ecrecover (sig, v, r, s) function, the public key can be recovered from an Ethereum signature. Since the Ethereum address earlier was calculated, it is already known what the outcome of the equation is. The function is called twice, once with v=27, and optionally a second time with v=28. One of the two calls result in the Ethereum address that was calculated earlier.

In embodiments, if the recovered public key matches the previously calculated public key, the Ethereum transaction can be sent. To sign a hash of the transaction object signed, if no value is set for r, s, and v before signing, Ethereum will not be able to determine the from the address of the transaction. In turn, Ethereum could determine an incorrect public key. The transaction will not be sent due to insufficient funds. To address the problem, a temporary value is set for rsv before hashing the transaction object. The temporary values are replaced with the real signature before sending. The web3 functionality determines the from address, resulting in a valid transaction if the account is funded.

The SMS backend 122 employs a broadcaster device 140 to broadcast the signed transaction to nodes of the blockchain 160. The miner devices 160 of the blockchain 161 add the signed transaction to a list of transactions that are to be added to the blockchain 161. The SMS backend 122 sends the hash of the transaction and a link L to the blockchain browser 150 (e.g., Etherscan) to the SMS gateway 121, which forwards the hash and the link L to the user device 110. The user device 110 uses the link and the transaction hash to access the transaction that is stored on the blockchain 161. To access the transaction, the user device 110 uses the link L and the hash of the transaction to access the blockchain browser 150. The blockchain browser 150 retrieves the transaction associated with the hash from the blockchain 161 and sends it to the user device 110.

FIG. 2 is a table illustrating example instructions for minting and transfer of NFTs, in accordance with one or more embodiments. In embodiments, the BSMS system 120 provides a wallet for each user that maps the public key of a user to the digital assets (e.g., cryptocurrency amounts) associated with the public key. The BSMS system 120 is illustrated and described in more detail with reference to FIG. 1. A BSMS application and the BSMS system 120 address requests other than creating a cryptographic operation (e.g., a transaction). The BSMS application supports the example instructions shown by FIG. 2. Likewise, embodiments of the table of FIG. 2 can include different and/or additional components or can be organized in different ways.

When a user enters an instruction in FIG. 1, the BSMS application converts the instruction into a request that is sent to the BSMS system 120 for processing. In embodiments, the BSMS system 120 supports the transfer of digital assets such as cryptocurrency or NFTs. An NFT typically represents a digital asset such as an image or a video clip. A cryptographic transaction representing ownership of the NFT is stored in the blockchain 161. The blockchain 161 is illustrated and described in more detail with reference to FIG. 1. A creator of the digital asset generates and records a transaction that transfers the digital asset to a recipient (e.g., identified by a phone number) of the digital asset using the BSMS system 120. The BSMS system 120 supports functionality to display token information such as the token name and receive the digital asset via a message. Although described primarily in the context of an SMS system, the methods and systems of the BSMS architecture can be used with other types of instant messaging and chat systems such as WhatsApp™, Google+Hangouts™, Google Talk™, Apple Messages™, Multimedia Messaging Service (MMS) TM, Facebook Messenger™, and so on.

For example, a user device 110 accesses an NFT by entering the following instruction into the BSMS application: TRANSFER BORED-APE #123 TO +1-123-456-7890. The instruction will transfer the NFT identified by "BORED-APE #123" to the recipient whose cell phone number is "+1-123-456-7890." In embodiments, the BSMS system 120 supports the following features:

1. Allowing a user's wallet to be accessed via SMS and WhatsApp™

2. Notifying sender and receiver about successful transfers between them.

3. Creating a transfer transaction for a receiver who has not registered with the SMS system. In embodiments, a sender identifies a recipient by their phone number. The sender informs the recipient to send an SMS message to the SMS gateway 121. The SMS gateway 121 is illustrated and described in more detail with reference to FIG. 1. The recipient sends an SMS message to the SMS gateway 121 for the SMS gateway 121 to generate a keypair for the recipient and add a recipient blockchain address to the transaction.

4. Transferring via phone numbers and wallets. For example, the following instructions each transfer 100 SUKU to the wallet associated with the recipient's phone number: (a) "TRANSFER 100 SUKU TO+1-123-456-7890." and (b) "TRANSFER 100 SUKU TO 0x06984cd546f369c6ce5bd9db1cba1af02108b030."

5. Using services of other DeFi services such as Uniswap, Compound, and SUKU DeFi (used for the swap and loan function).

Figure 3:
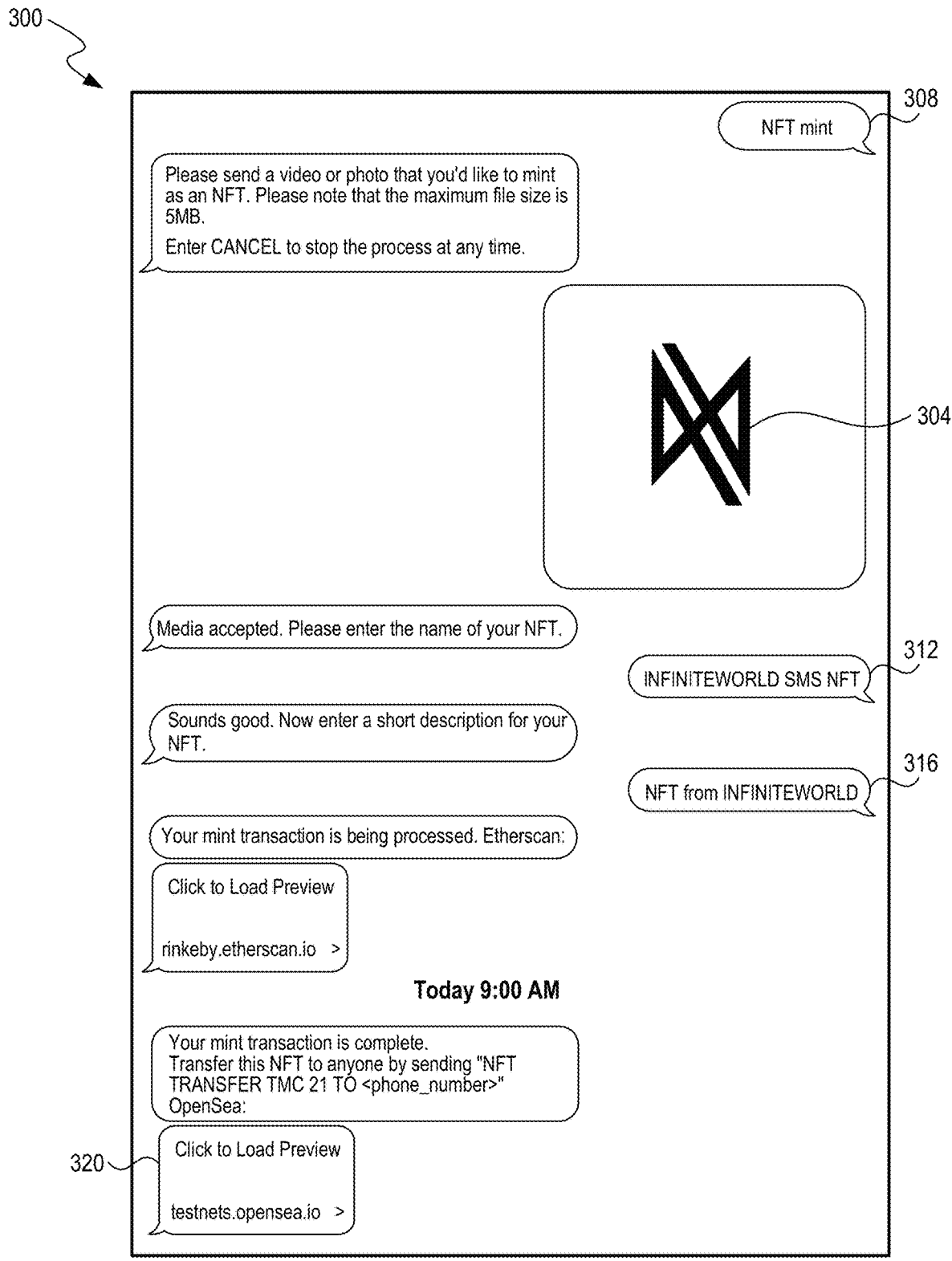
FIG. 3 is a drawing illustrating an example user interface for minting and transfer of NFTs using SMS, in accordance with one or more embodiments.

FIG. 3 is a drawing illustrating an example user interface 300 for minting and transfer of NFTs using SMS, in accordance with one or more embodiments. In embodiments, the computer system 1400, the system 100, or the BSMS system 120 generates a mint graphical user interface (GUI) 300, for example, the user interface shown by FIG. 3, initiable by a mint instruction 308 received at the user device 110. The computer system 1400 is illustrated and described in more detail with reference to FIG. 14. The user device 110 and BSMS system 120 are illustrated and described in more detail with reference to FIG. 1. The user device 110 includes a display screen. The mint GUI 300 is configured to generate and transmit SMS messages from the user device 110 to the computer system 1400.

The computer system 1400 causes the mint GUI 300 to display on the display screen of the user device 110 for minting an NFT 304. The computer system 1400 receives SMS messages or a first SMS message describing at least one of an address where a digital asset is stored, a digital asset name 312, a digital asset description 316, and digital asset metadata from the user device 110. The digital asset name 312 can be the same as or reused as the name of the NFT 304. The computer system 1400 causes the NFT 304 to be minted at a blockchain address 320 using the digital asset 304, the digital asset name 312, the digital asset description 316, and the digital asset metadata. The computer system 1400 generates an NFT name, a token identifier, and a collection name of a digital asset collection to which the NFT belongs. Likewise, embodiments of the mint GUI 300 can include different and/or additional components or can be arranged in different ways.

For example, the minting, transferring, and searching for NFTs is performed using SMS text messages that provide a user interface and a backend system for accessing information on NFTs and transferring NFTs. The backend system is the same as or similar to the SMS backend 122 illustrated and described in more detail with reference to FIG. 1. An NFT-SMS system allows a user to mint an NFT by providing an SMS user interface for minting that is initiated with a "mint" instruction 308. The mint user interface provides and receives SMS messages that enable the user device 110 to specify where the digital asset is stored, a name of and description for the asset, other metadata, and so on.

In embodiments, the computer system 1400 interacts with a storage system to store the digital assets such as cryptocurrency or NFT, wherein the NFT is addressed by a URL, and wherein the storage system is a peer-to-peer network that stores and shares data in a distributed file system. The computer system 1400 sends, to the user device 110, SMS messages or a second SMS message describing the URL, the NFT name, the token identifier, and the collection name. For example, when the SMS backend 122 receives an SMS message with the needed information, the SMS backend 122 retrieves the asset and interacts with the storage system (e.g., Inter-Planetary File System (IPFS)) to store the digital asset identified by a URL.

For example, digital assets such as tokens or NFTs are represented by cryptographic operations (e.g., transactions) stored in a blockchain that include an asset name and description, an asset identifier, a URL indicating where the asset is stored, an asset owner, and so on. To create (or mint) an NFT, the owner of the asset stores the asset and associated metadata on a storage system such as the IPFS. The owner then creates a cryptographic operation (e.g., an NFT transaction) and stores it in a blockchain. Other users of the blockchain system can review the NFT transactions and possibly use the URL to view the asset that is stored by the storage system. To transfer the asset to a new owner, the current owner sends a transfer message to the smart contract associated with the NFT transaction, which records another NFT transaction with the new owner as the now-current owner of the asset.

In embodiments, the user device 110 is a first user device (e.g., belonging to a first user), and the display screen is a first display screen. In some embodiments, the user device 110 is one of multiple devices used by the same user. The computer system 1400 generates a transfer GUI initiable by a transfer instruction received at a second user device that has a second display screen. For example, a TRANSFER NFT instruction is illustrated and described in more detail with reference to FIG. 2. An example transfer GUI 500 is illustrated and described in more detail with reference to FIG. 5. The transfer GUI 500 is configured to generate and transmit SMS messages from the second user device to the computer system 1400. The SMS messages are illustrated and described in more detail with reference to FIG. 1.

The computer system 1400 causes the transfer GUI 500 to display on the second display screen for transferring the digital assets such as cryptocurrency or NFT to a recipient. In embodiments, responsive to receiving, from the second user device, SMS messages (e.g., a third SMS message) describing a token identifier, a collection name, a recipient blockchain address, and a phone number of the recipient: the computer system 1400 resolves the collection name to a collection blockchain address based on the SMS messages or the third SMS message. The computer system 1400 generates a cryptographic transaction on the blockchain 161 to transfer the NFT from the collection blockchain address to the recipient blockchain address. For example, the computer system 1400 causes the mint GUI 300 to display on the display screen of the user device 110 for minting an NFT. For example, the NFT 304 shown by FIG. 3 is a stylized infinity sign (e.g., trademark of INFINITEWORLD™), name of the asset is "INFINITEWORLD SMS NFT," and its description is "NFT from INFINITEWORLD." Once the NFT is created, the mint GUI 300 provides instructions on how to transfer the asset to a new owner. An example owner 408 is referenced by FIG. 4. The NFTs can be organized into collections such as by service provider (e.g., TextMeCrypto, BAYC, and Cryptopunks).

In embodiments, the computer system 1400 sends a request to an HSM 130 communicably coupled to the blockchain 161 to cryptographically sign a hash of the cryptographic transaction using a private key associated with the phone number of the recipient. For example, each participant using a cryptocurrency system is represented as a pseudo-anonymous cryptographic identity, and has a sequence of transaction characters, called public key or a hash of a public key. In addition, each participant also holds a cryptographic "private key" that pairs with its public key. The private key transfers ownership from one party to another party, and is needed to transfer or spend any owned cryptocurrency. The HSM 130 is illustrated and described in more detail with reference to FIG. 1. The computer system 1400 records the signed cryptographic transaction on the blockchain 161. For example, the SMS backend 122 generates and stores an NFT transaction that references the owner and identifies the asset using an NFT (token) identifier.

In embodiments, a cryptographic transaction references an NFT owner of the NFT. A token identifier is associated with metadata, including a URL pointing to the NFT. The token identifier is specified in a data interchange format that uses human-readable text to store and transmit data objects consisting of attribute-value pairs and arrays. For example, the NFT identifier is associated with metadata (including the URL) that may be specified in a Java Script Object Notation (JSON) format. The SMS backend 122 provides the NFT identifier to OpenSea (or comparable service) for indexing and tracking of NFTs. The NFT-SMS system may employ the ERC-721 standard.

In embodiments, the user device 110 is a first user device, and the display screen is a first display screen. The computer system 1400 generates a display GUI 400 for displaying the NFT 304 on a second display screen of a second user device. The display GUI 400 is illustrated and described in more detail with reference to FIG. 4. The display GUI 400 is initiable by a "display" or "view" instruction 404 received at the second user device. The display GUI 400 is configured to generate and transmit SMS messages from the second user device to the computer system 1400. The computer system 1400 causes the display GUI 400 to display on the second display screen for searching for the NFT 304.

Figure 4:
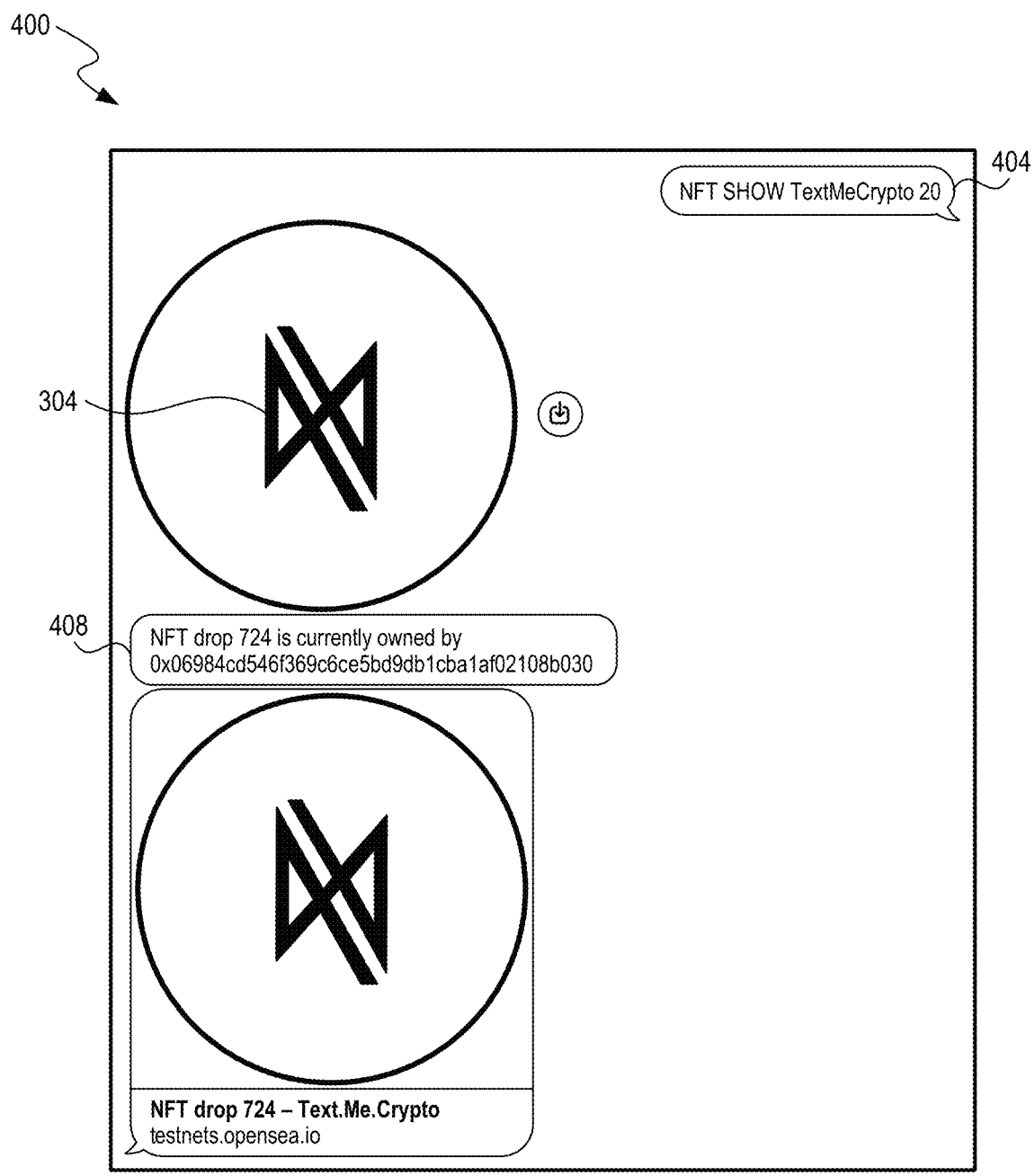
FIG. 4 is a drawing illustrating an example user interface for minting and transfer of NFTs using SMS, in accordance with one or more embodiments.

FIG. 4 is a drawing illustrating an example user interface 400 for minting and transfer of NFTs using SMS, in accordance with one or more embodiments. In embodiments, the computer system 1400 generates a display GUI 400 for displaying digital assets such as cryptocurrency or an NFT 304 on a display screen of the user device 110. The computer system 1400 is illustrated and described in more detail with reference to FIG. 14. The user device 110 is illustrated and described in more detail with reference to FIG. 1. The display GUI 400 is initiable by a "display" or "SHOW" instruction 404 received at the user device 110. The display GUI 400 is configured to generate and transmit SMS messages from the user device 110 to the computer system 1400. The computer system 1400 causes the display GUI 400 to display on the display screen.

For example, to view the NFT 304, the NFT-SMS system (system 100) provides a view GUI 400 (sometimes referred to as a "display GUI") that is initiated with a "show" command. The system 100 is illustrated and described in more detail with reference to FIG. 1. The view GUI 400 enables a user to enter a collection name and NFT identifier. Likewise, embodiments of the view GUI 400 can include different and/or additional components or can be arranged in different ways.

In embodiments, an SMS message received by the computer system 1400 describes an NFT name, an NFT description, and NFT metadata. The digital asset name 312 (see FIG. 3) can be the same as or reused as the name of the NFT 304. The system 1400 determines that the NFT 304 has been minted by analyzing the SMS message. The computer system 1400 retrieves the NFT 304 from a collection blockchain address. For example, the SMS backend 122 receives an SMS message with the collection name and NFT identifier and then searches for that token in the collection. The SMS backend 122 is illustrated and described in more detail with reference to FIG. 1. The SMS backend 122 uses various techniques to match the collection name entered by the user with the name of a digital asset collection. For example, if the user inputs "texmecryp" or "textmycrypto," into an SMS message, the SMS backend 122 resolves the input to "TextMeCrypto."

In embodiments, the computer system receives, from a user device (e.g., a second user device), SMS messages (e.g., a third SMS message) describing the token identifier and the collection name. Responsive to receiving the third SMS message, the computer system 1400 interacts with a smart contract corresponding to the digital asset collection based on the third SMS message. Responsive to interacting with the smart contract, the computer system 1400 receives the digital asset metadata from the smart contract. The computer system 1400 retrieves the NFT 304 from the blockchain address using the digital asset metadata, and displays a preview of the NFT 304 and an NFT owner 408 using the display GUI 400. For example, after the collection is identified, the SMS backend 122 calls a smart contract for that collection using the NFT identifier and receives metadata for the NFT 304. The SMS backend 122 uses the metadata to access the asset at the URL of the metadata and provides a preview of the asset, name, owner, etc., via the view GUI 400.

Figure 5:
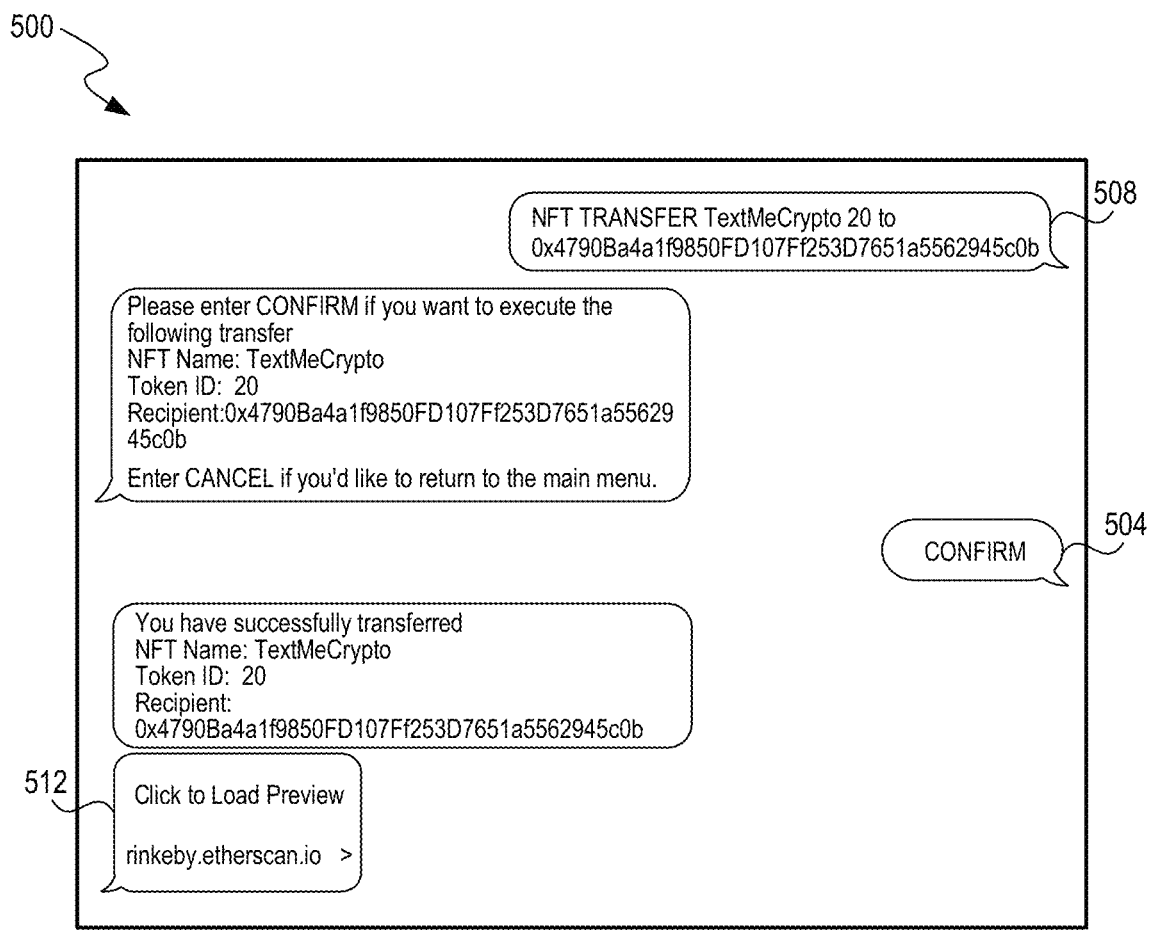
FIG. 5 is a drawing illustrating an example user interface for minting and transfer of NFTs using SMS, in accordance with one or more embodiments.

FIG. 5 is a drawing illustrating an example user interface 500 for minting and transfer of NFTs using SMS, in accordance with one or more embodiments. In embodiments, the computer system 1400 generates a transfer GUI 500 initiable by a transfer instruction received at a user device 110 including a display screen. The computer system 1400 is illustrated and described in more detail with reference to FIG. 14. The user device 110 is illustrated and described in more detail with reference to FIG. 1. An example TRANSFER instruction is illustrated and described in more detail with reference to FIG. 2. The transfer GUI 500 is configured to generate and transmit SMS messages from the user device 110 to the computer system 1400. The computer system 1400 causes the transfer GUI 500 to display on the display screen for transferring digital assets such as cryptocurrency or an NFT 304 to a recipient. The NFT 304 is illustrated and described in more detail with reference to FIG. 3. Likewise, embodiments of the transfer GUI 500 can include different and/or additional components or can be arranged in different ways.

For example, to transfer an NFT, the NFT-SMS system (system 100) provides a transfer user interface 500 that is initiated by a "transfer" command 508. The user enters a name of a digital asset collection, an NFT identifier, and a recipient identifier. The recipient can be identified with a mobile telephone number, a blockchain address, and so on. The SMS backend 122 can resolve the name to the actual name of the collection or a collection blockchain address. The SMS backend 122 is illustrated and described in more detail with reference to FIG. 1.

In embodiments, the computer system 1400 receives, from the user device 110, an SMS message describing a token identifier of the NFT 304, a collection name of a digital asset collection to which the NFT 304 belongs, a recipient blockchain address of the recipient, and a phone number of the recipient. Responsive to receiving the SMS message, the computer system 1400 resolves the collection name to a collection blockchain address based on the SMS message. The computer system 1400 determines that an amount of cryptocurrency referenced by the recipient blockchain address is greater than or equal to a threshold amount corresponding to the NFT 304. For example, the SMS backend 122 determines that the seller has sufficient funds (e.g., gas) to pay for the cryptographic operation (e.g., the transaction), that the recipient identifier exists, and so on. The SMS backend 122 can request the user to confirm 504. If confirmed, the SMS backend 122 calls a "safeTransferFrom" function of the ERC-721 smart contract and then provides a transaction link 512 to the transaction on Etherscan.

In embodiments, blockchains are used to support transactions irrespective of the "blockchain protocol" used. Blockchain systems can also deploy additional layers of functionality on top of the base distributed ledger. An example of such layers is a "smart contract," which is computer code that implements a programmable functionality, such as a contract. The computer code would be executed by any node that validates transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset.

Tokens also have an owner that uses an additional public/private key pair. The owner public key is set as the token owner identity, and when performing actions against tokens, ownership proof is established by providing a signature generated by the owner private key and validated against the public key listed as the owner of the token. For example, a person can be uniquely identified using a combination of a user name, social security number, and biometric (e.g., fingerprint). Additionally, a product (e.g., refrigerator) can be uniquely identified using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) involving the asset stored in a blockchain, creating a full audit trail of the transactions.

Figure 6:
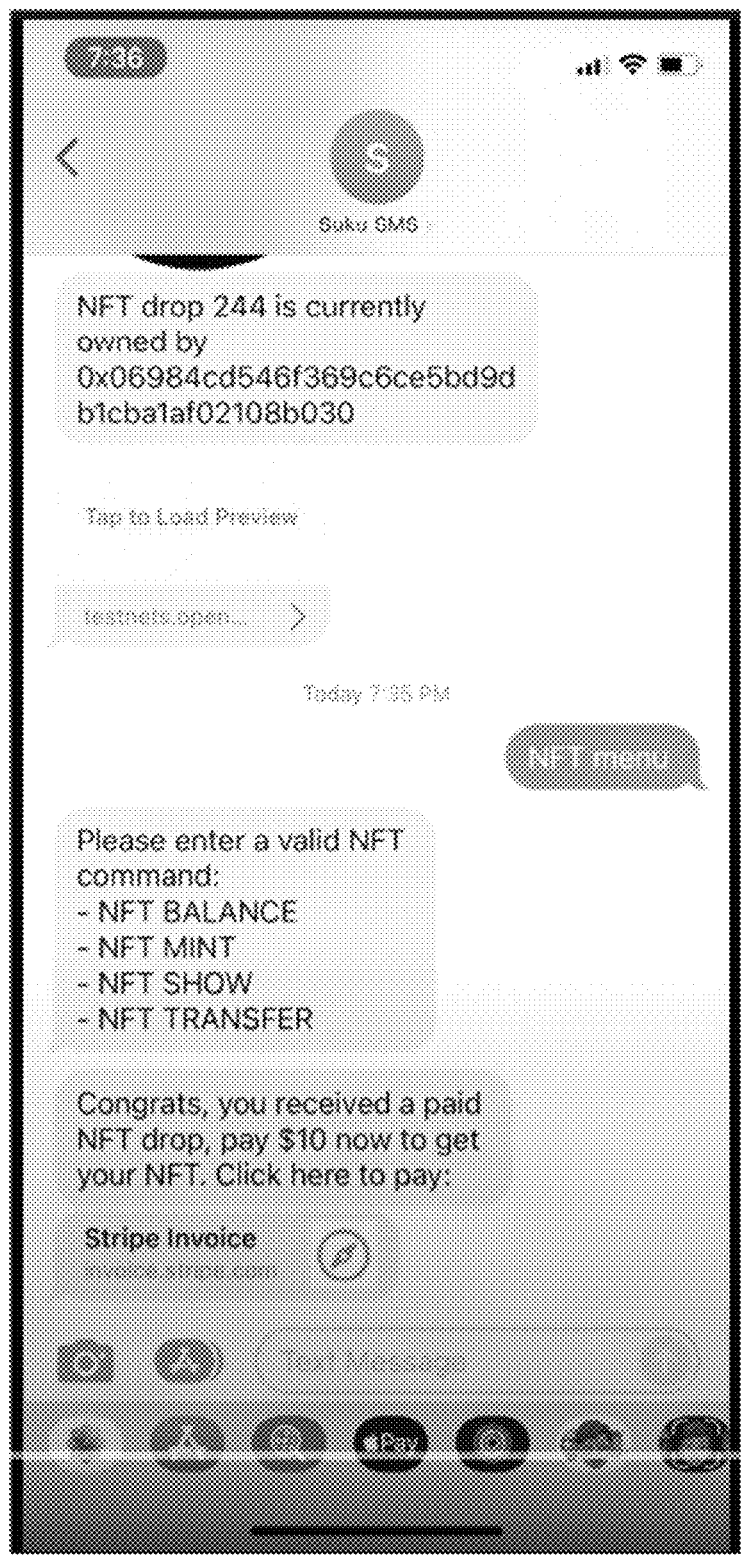
FIG. 6 is a drawing illustrating an example user interface for minting and transfer of NFTs using SMS, in accordance with one or more embodiments.

FIG. 6 is a drawing illustrating an example user interface for minting and transfer of NFTs using SMS, in accordance with one or more embodiments. The NFT-SMS system (e.g., system 100) enables a user to purchase digital assets such as cryptocurrency or an NFT 304. The system 100 is illustrated and described in more detail with reference to FIG. 1. The NFT 304 is illustrated and described in more detail with reference to FIG. 3. The NFT-SMS system provides a drop notification user interface using a backend system (e.g., the SMS backend 122). The SMS backend 122 is illustrated and described in more detail with reference to FIG. 1. The drop notification user interface identifies the NFT of the drop and provides a link for previewing the NFT. The user device 110 is also notified of the cost of the NFT and provided with a link to a payment service (e.g., Stripe™) through which payment can be made. Likewise, embodiments of the drop notification user interface can include different and/or additional components or can be arranged in different ways.

Figure 7:
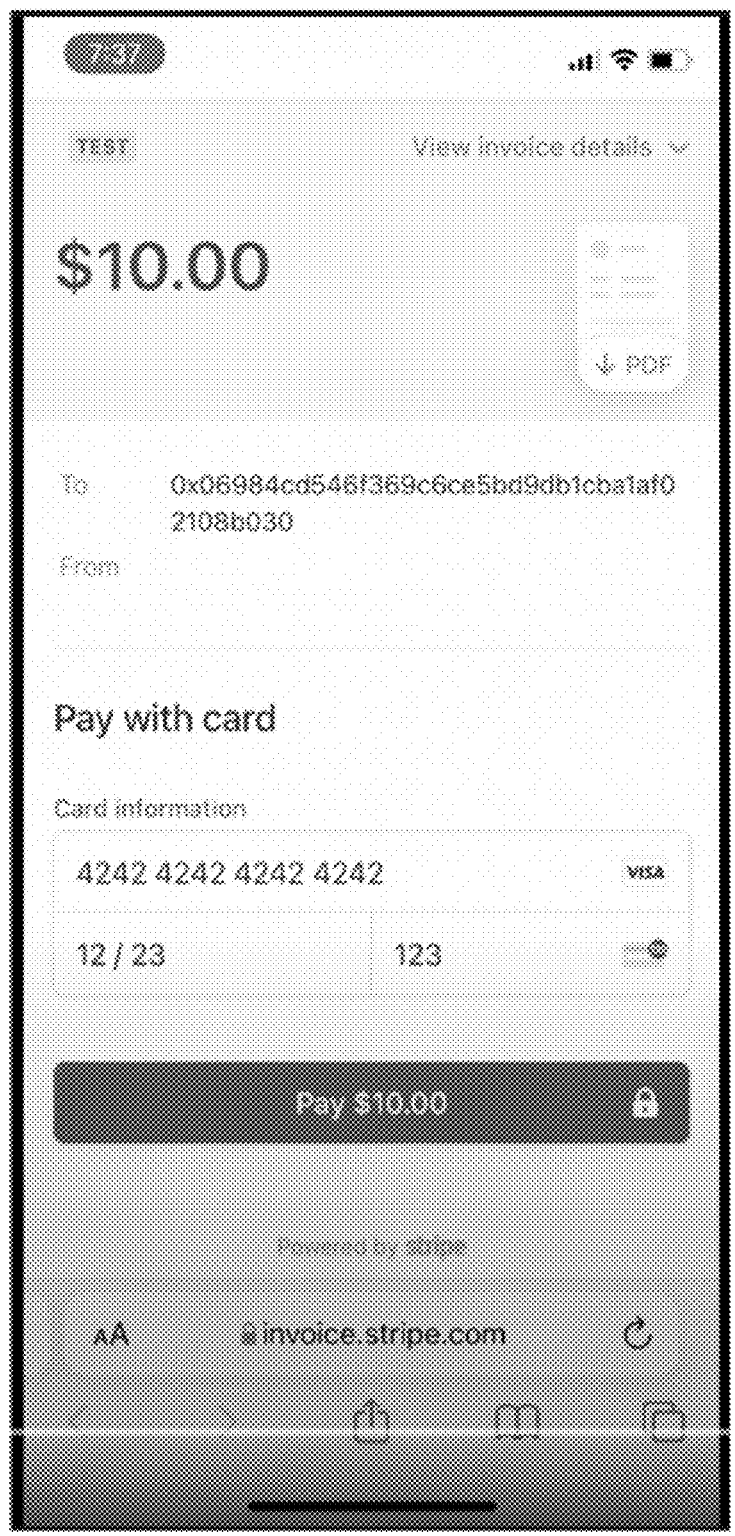
FIG. 7 is a drawing illustrating an example user interface for minting and transfer of NFTs using SMS, in accordance with one or more embodiments.

FIG. 7 is a drawing illustrating an example user interface for minting and transfer of NFTs using SMS, in accordance with one or more embodiments. The user interface shown by FIG. 7 is used when a user selects a link to a payment service. The user enters payment information as illustrated in FIG. 7. In embodiments, to record a simple cryptographic operation (e.g., a transaction) in a blockchain, each party and asset involved with the transaction needs an account that is identified by a digital identity. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

Figure 8:
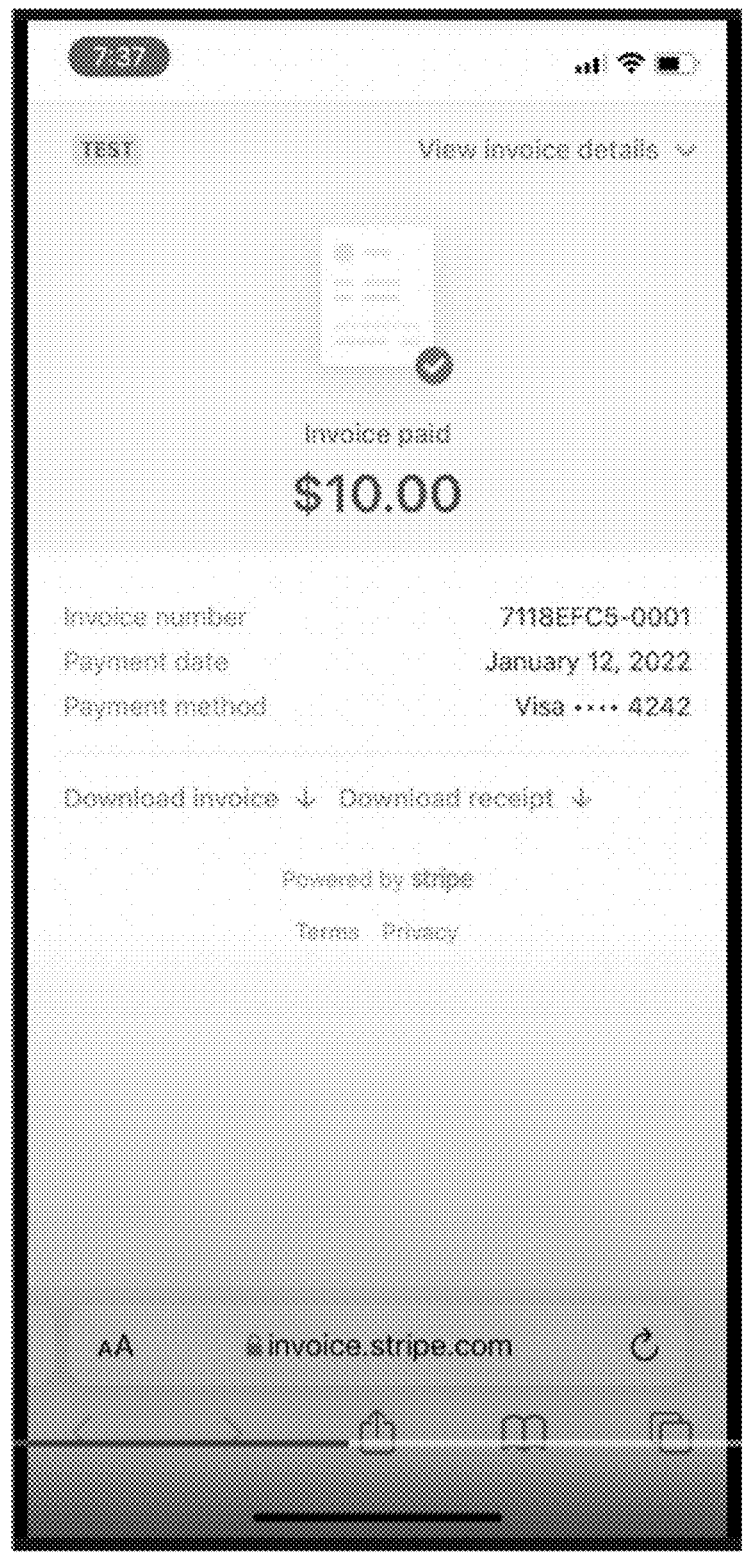
FIG. 8 is a drawing illustrating an example user interface for minting and transfer of NFTs using SMS, in accordance with one or more embodiments.

FIG. 8 is a drawing illustrating an example user interface for minting and transfer of NFTs using SMS, in accordance with one or more embodiments. In embodiments, to enable more complex cryptographic operations (e.g., transactions) than bitcoin can support, some systems use "smart contracts." A smart contract is computer code that implements codified terms of a contract. The algorithm in the smart contract is executed in a decentralized way by every node that is running the blockchain. To execute the contract code, the platform uses a deterministic virtual machine platform (e.g., an Ethereum platform), which provides a virtual machine that supports recording cryptographic operations (e.g., transactions) in blockchains. In addition, the smart contract itself is recorded as a transaction in the blockchain so that the integrity of the computer code is enabled. When deployed, a part of the smart contract code called constructor of the smart contract executes, initializing the smart contract and its state. The state of a smart contract is stored persistently in the blockchain.

Once deployed, a contract is given an address similar to a public key but without a corresponding private key. When a transaction is recorded against a smart contract, a message is sent to the smart contract (i.e., recorded in a transaction of the blockchain that identifies the smart contract), and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset, such as a car, other than cryptocurrencies. The inputs to a smart contract to sell a car may be 1) the identity tokens and public keys of the seller, 2) the identity tokens of the buyer, 3) the identity token (described below) of the car, and 4) the sale price in U.S. dollars. The computer code ensures that the seller is the current owner of the car and that the buyer has sufficient funds in their account.

The computer code records a transaction that transfers the ownership of the car to the buyer and a transaction that transfers the funds (sale price) from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

Figure 9:
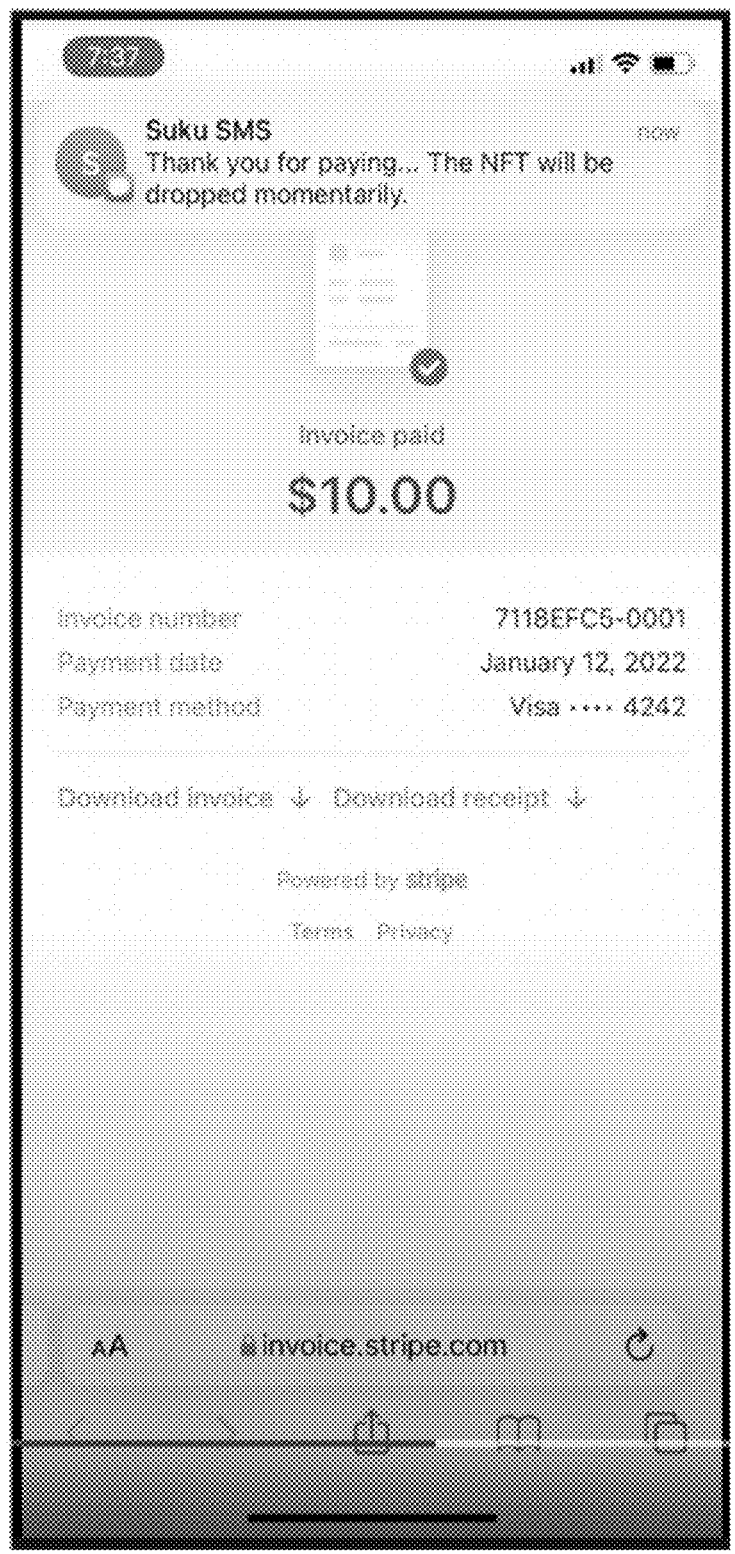
FIG. 9 is a drawing illustrating an example user interface for minting and transfer of NFTs using SMS, in accordance with one or more embodiments.

FIG. 9 is a drawing illustrating an example user interface for minting and transfer of NFTs using SMS, in accordance with one or more embodiments. The payment service coordinates payment for digital assets, such as cryptocurrency or the NFT 304, and confirmation is provided as shown by FIGS. 8 and 9. The NFT 304 is illustrated and described in more detail with reference to FIG. 3. In embodiments, when a message is sent to a smart contract to record a cryptographic operation (e.g., a transaction), the message is sent to each node that maintains a replica of the blockchain. Each node executes the computer code of the smart contract to implement the transaction. For example, if a hundred nodes each maintain a replica of a blockchain, then the computer code executes at each of the nodes. When a node completes execution of the computer code, the result of the transaction is recorded in the blockchain. The nodes employ a consensus algorithm (or other mining technique) to decide which transactions to keep and which transactions to discard.

The next higher functionality layer, built on top of the smart contract layer, is called "application layer." The layer supports decentralized applications (dApps) and tokens representing assets other than cryptocurrency, such as digital, physical, virtual, or legal assets. Through use of tokens, distributed ledger systems can support transactions of any type, such as those relating to the sale of vehicles, sale of financial derivatives, sale of stock, payments on contracts, and so on. Tokens, which are also referred to as digital bearer bonds, uniquely identify something that can be owned or can own other things. Tokens also have an owner having their own public/private key pair.

The owner's public key is set as the token owner identity, and when performing actions against tokens, ownership proof is established by providing a signature generated by the owner's private key and validated against the public key listed as the owner of the token. Tokens can be used to identify people, institutions, commodities, contracts, computer code, equities, derivatives, bonds, insurance, loans, documents, and so on. Tokens can also be used to identify collections of assets. The creation of a token for an asset in a blockchain establishes provenance of the asset. To record a simple transaction in a blockchain, each participant that is a party to the transaction typically has an account that is identified by a public key.

For example, when one person wants to transfer a car to another person, the current owner and the next owner create accounts, and the current owner also creates a token that uniquely identifies the car. The token for the car identifies the current owner. The current owner creates a transaction against the token for the car that indicates that the transaction is a transfer of ownership, indicates the public keys of the current owner and the next owner, and indicates the identity token of the car. Many blockchain systems, such as the Bitcoin system, employ distributed consensus techniques to achieve a consensus as to what blocks and what transactions within those blocks are to be included in the blockchain. For example, with the Bitcoin system, a node that creates a transaction broadcasts that transaction to other nodes of the Bitcoin system. The receiving nodes store those transactions.

At intervals (e.g., approximately 10 minutes), some of the nodes, referred to as mining nodes, each generates a new block of transactions that the mining node plans on proposing to be added to the blockchain. The new block includes transactions that have not yet been included in any block of the blockchain and a "coinbase" transaction. The coinbase transaction creates an amount of bitcoin as a mining fee and transfers that amount along with any transaction fees for transactions in the new block to a public key designated by the mining node as a mining reward. A transaction fee of a transaction is the difference between value of the inputs and the value of the outputs of that transaction. The new block also includes a hash of the block that is to be prior to the new block in the blockchain.

Figure 10:
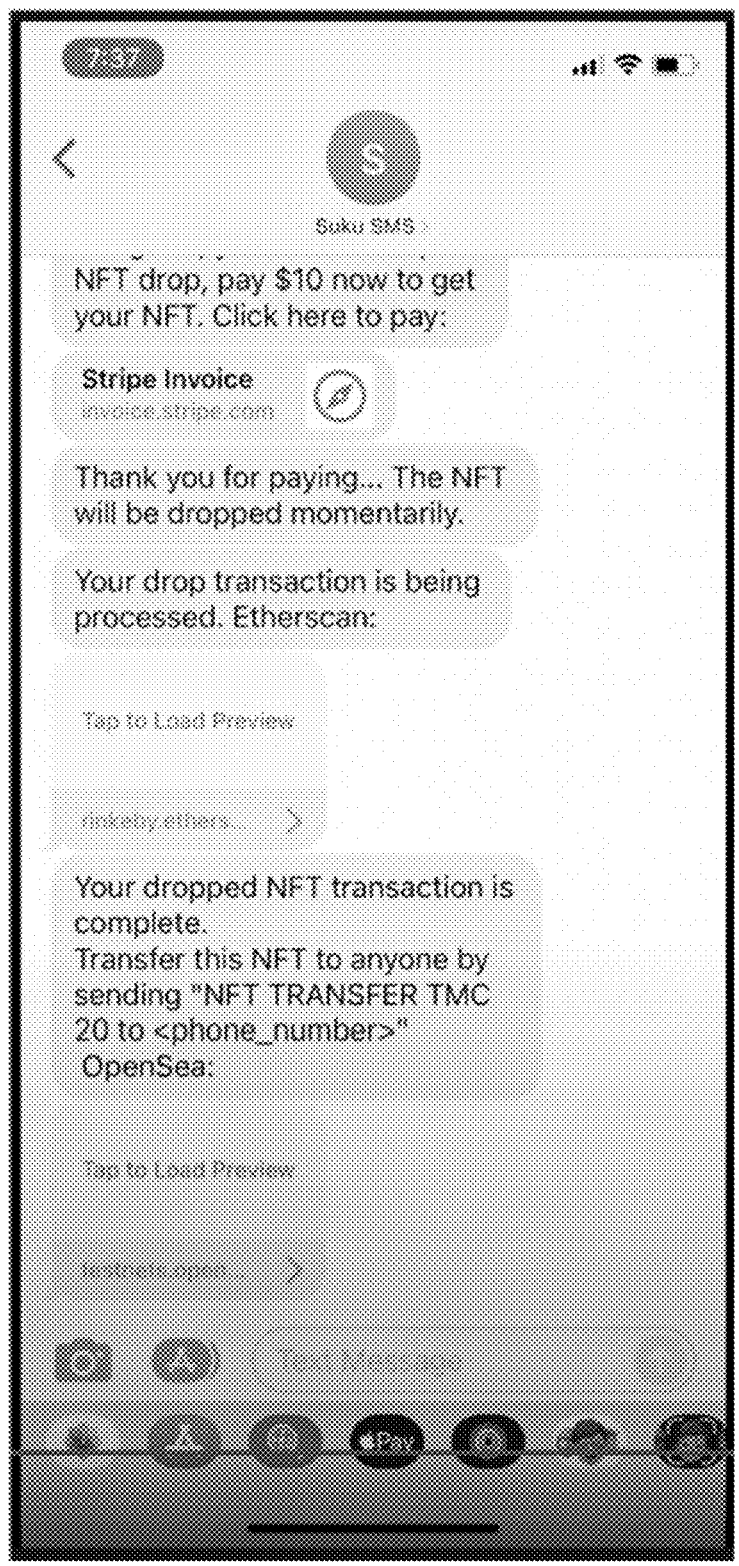
FIG. 10 is a drawing illustrating an example user interface for minting and transfer of NFTs using SMS, in accordance with one or more embodiments.

FIG. 10 is a drawing illustrating an example user interface for minting and transfer of NFTs using SMS, in accordance with one or more embodiments. A backend system (e.g., the SMS backend 122) provides a completion user interface to indicate that the digital assets, such as cryptocurrency or NFT drop, has been completed as shown by FIG. 10. The SMS backend 122 is illustrated and described in more detail with reference to FIG. 1. To ensure that a previous owner of a digital asset such as a bitcoin did not double-spend the bitcoin (i.e., transfer ownership of the same bitcoin to two parties), the bitcoin system maintains a distributed ledger of cryptographic operations (e.g., transactions). Transaction interdependencies (one needs to have the bitcoin before one sends it) and consensus mechanisms are key to prevent double spending.

With the distributed ledger, a ledger of all the transactions for a bitcoin is stored redundantly at multiple nodes (i.e., computers) of a blockchain network. The ledger at each node is stored as a blockchain. In a blockchain, transactions are stored in order and each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce, or arbitrary value, that is added to the block when it is created. A bitcoin ledger is sometimes referred to as an Unspent Transaction Output ("UTXO") set because it tracks the output of all transactions that have not yet been spent.

In embodiments, Bitcoin uses a Proof-of-Work system where the right to create a block is determined by solving a computationally difficult puzzle. An example of such a puzzle is to find a block header whose hash has some desired characteristic, such as 12 leading zeros. The header of each block includes a field, referred to as a nonce. A mining node repeatedly tries different values for the nonce until a value for the nonce is found that results in the hash having the desired characteristic. A coinbase transaction also has a nonce. So, if a hash with the desired characteristic cannot be found after all values of the nonce in the header are tried, the mining node can change a value in the coinbase transaction (or alternatively change the time stored in the coinbase transaction) and then again try all values of the nonce in the header and repeat the process of changing values in the nonces until a hash with the desired characteristic is found. The process of finding a hash with the desired characteristic is referred to as "mining."

After a mining node generates a valid new block, it broadcasts the new block to other nodes as a proposed block. Other mining nodes implicitly consent to having the proposed block included in the blockchain by generating future proposed blocks that include that proposed block in the blockchain. During an interval, multiple mining nodes could generate and broadcast proposed blocks at nearly the same time. Generally, the first proposed block that a node receives will be included in its primary view of the blockchain, but it will also have an alternate view (e.g., a fork) that includes the other proposed blocks.

When a mining node generates and broadcasts the next proposed block for the next interval, each mining node will add the next proposed block to its primary view of the blockchain. Upon receiving the next proposed block, a node can then determine whether its primary view or alternate view is the view to use going forward. Eventually, each node can assume that a proposed block in the primary view is permanently included in the blockchain based on the number of subsequent proposed blocks (e.g., six) that have been added to the primary view. The process of proposing blocks and deciding which proposed blocks to include in the blockchain is referred to as achieving a distributed consensus. Because the mining nodes need to expend computational resources to find the nonce for a proposed block, the distributed consensus is referred to as a Proof-of-Work consensus. That is, each mining node needs to prove that it performed the work to find such a nonce.

As an alternative to a Proof-of-Work consensus, some blockchain systems may employ a Proof-of-Stake consensus. A Proof-of-Stake consensus, as its name implies, relies on a participant's "stake" in the blockchain system. A participant's stake can be based on different types of measurements of involvement with a blockchain system, such as frequency and recency of transactions involving a participant, but is generally measured by the amount of cryptocurrency or other unit of value that is owned by the participant in a blockchain at a certain block. For example, a participant who owns 10.015 cryptocurrency tokens as measured at block 14,614 has a stake of 10.015 at block 14,614.

The "total stake" of a blockchain at a given block is the sum of the stakes of all the participants at that block. A node could determine the stake of each participant by scanning the entire blockchain each time the stake is needed. Alternatively, a node could initially generate a table that maps participants to their stakes by scanning the blockchain and then update the table as new blocks are added. With a Proof-of-Stake consensus, a node executes a selection function to determine which nodes can propose blocks to be added to the blockchain. The selection function is a random function that is weighted based on the stake of the participant. Thus, participants with large stakes will have the opportunity to propose blocks more frequently than those participants with small stakes.

Figure 11:
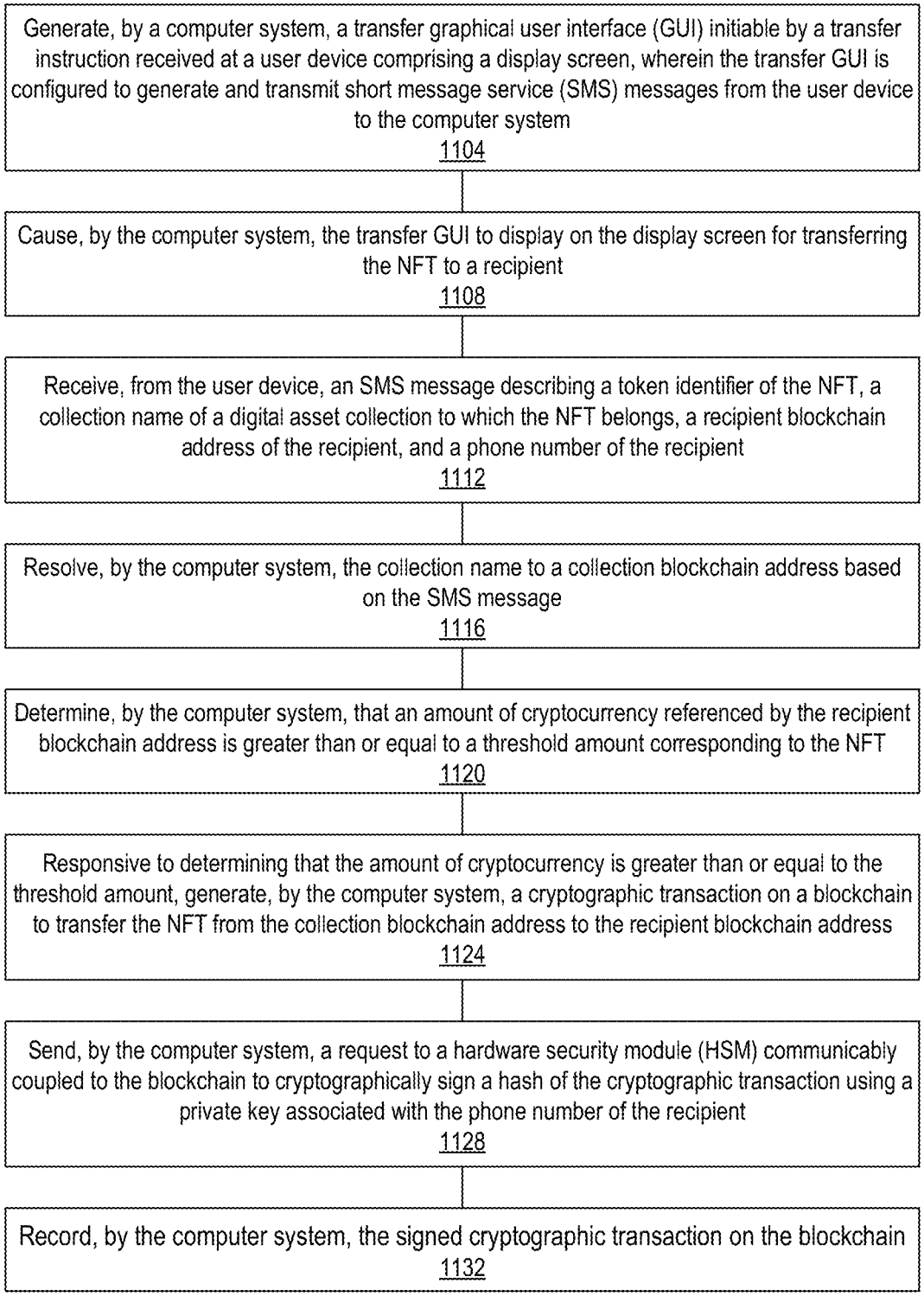
FIG. 11 is a flow diagram illustrating an example process for minting and transfer of NFTs using SMS, in accordance with one or more embodiments.

FIG. 11 is a flow diagram illustrating an example process for minting and transfer of NFTs using SMS, in accordance with one or more embodiments. In some embodiments, the process of FIG. 11 is performed by the system 100 illustrated and described in more detail with reference to FIG. 1. In other embodiments, the process of FIG. 11 is performed by a computer system (e.g., the example computer system 1400 illustrated and described in more detail with reference to FIG. 14. For particular entities, for example, the SMS backend 122 performs some or all of the steps of the process in other embodiments. The SMS backend 122 is illustrated and described in more detail with reference to FIG. 1.

Likewise, embodiments can include different and/or additional steps, or perform the steps in different orders.

In step 1104, the computer system 1400 generates a transfer GUI 500 initiable by a transfer instruction 508 received at a user device 110 including a display screen. The transfer GUI 500 and transfer instruction 508 are illustrated and described in more detail with reference to FIG. 5. The user device 110 is illustrated and described in more detail with reference to FIG. 1. The transfer GUI 500 is configured to generate and transmit SMS messages from the user device 110 to the computer system 1400.

In step 1108, the computer system 1400 causes the transfer GUI 500 to display on the display screen for transferring digital assets, such as cryptocurrency or the NFT 304, to a recipient. The NFT 304 is illustrated and described in more detail with reference to FIG. 3.

In step 1112, the computer system 1400 receives, from the user device 110, one or more SMS messages describing a token identifier of the digital assets, such as cryptocurrency or NFT 304, a collection name of a digital asset collection to which the NFT 304 belongs, a recipient blockchain address of the recipient, and a phone number of the recipient. In embodiments, the SMS messages describe an NFT name 312, an NFT description 316, and NFT metadata. The NFT name 312 and NFT description 316 are illustrated and described in more detail with reference to FIG. 3. In embodiments, the computer system 1400 determines that the NFT 304 has been minted by analyzing the SMS messages. The computer system 1400 retrieves the NFT 304 from the collection blockchain address.

In step 1116, the computer system 1400 resolves the collection name to a collection blockchain address based on the SMS messages. For example, the collection name is converted to a string of text that uniquely identifies the source or destination of a cryptographic operation (e.g., a transaction) and is used to send and receive funds of digital assets on a blockchain network.

In step 1120, the computer system 1400 determines that an amount of cryptocurrency referenced by the recipient blockchain address is greater than or equal to a threshold amount corresponding to the NFT 304. To transfer ownership of digital assets, a new transaction is generated and added to a stack of transactions in a block. The new transaction created, which includes the public key of the new owner, is digitally signed by the owner with the owner's private key (of a public/private key pair) to transfer ownership to the new owner, as represented by the new owner public key. The signing by the owner of the bitcoin is an authorization by the owner to transfer ownership of, for example, the bitcoin, to the new owner via the new transaction. A transaction is not complete until it has been placed inside a block. A cryptocurrency system, which is referred to as a blockchain system, stores the transactions in blocks of a "blockchain." The cryptocurrency system continually receives many such transactions, which are placed inside blocks. Each block holds transactions in a cryptographic structure called a Merkle tree. Once the block is full, the block is "capped" with a block header, which contains the hash digest of all the transaction identifiers within the Merkle tree containing the block transactions. The hash of the previous block and/or a block's header is recorded in the block header of the next block in the chain to create a mathematical hierarchy called a "blockchain" of blocks. To verify the current ownerships, the blockchain of transactions can be followed from older transactions to new transactions where outputs of older transactions are inputs to newer transactions.

In step 1124, responsive to determining that the amount of cryptocurrency is greater than or equal to the threshold amount, the computer system 1400 generates a cryptographic transaction Tx on a blockchain 161 to transfer the NFT 304 from the collection blockchain address to the recipient blockchain address. An example cryptographic transaction Tx and blockchain 161 are illustrated and described in more detail with reference to FIG. 1. In embodiments, the cryptographic transaction references an NFT owner of the NFT 304. The token identifier is associated with metadata, including a URL pointing to the NFT 304. The token identifier is specified in a data interchange format that uses human-readable text to store and transmit data objects consisting of attribute-value pairs and arrays.

In step 1128, the computer system 1400 sends a request to an HSM 130 communicably coupled to the blockchain 161 to cryptographically sign a hash of the cryptographic transaction Tx using a private key associated with the phone number of the recipient. The HSM 130 is illustrated and described in more detail with reference to FIG. 1. The process of cryptographically signing a hash of a cryptographic transaction using a private key associated with a phone number of a recipient is described in more detail with reference to FIG. 1. In embodiments, an SMS message from the user device 110 to the computer system 1400 is a first SMS message. The computer system 1400 transmits the token identifier to a website (e.g., an online NFT marketplace) for indexing and tracking the NFT 304. The computer system 1400 sends a second SMS message to the phone number of the recipient, describing a URL pointing to a location on the website (e.g., an online NFT marketplace) referencing the NFT 304.

For example, online digital marketplaces for NFTs have been developed to facilitate finding NFTs and transferring ownership of them. One such marketplace is OpenSea™. OpenSea scans a blockchain to identify NFTs, retrieves metadata for the assets stored by the storage system, and indexes the data about the NFTs. A user can use OpenSea to search for assets based on their asset name and description. OpenSea allows owners of assets to publish their assets that are for sale-typically for auction. Entities can search for auction such as by their name and description. A buyer interested in acquiring an asset can place a bid. Depending on the terms of the sale, various auction types can be used, such as auctions with a reserve bid, a buyout option, and so on. Once the auction is complete, OpenSea coordinates the recording of the transactions, such as an NFT transaction, a debit transaction from the buyer, a credit transaction to the seller, or a combination thereof.

In step 1132, the computer system 1400 records the signed cryptographic transaction on the blockchain 161. The process of recording a signed cryptographic transaction on a blockchain is described in more detail with reference to FIG. 1. For example, blocks of the blockchain 161 are publicly available to anyone to view and verify each and every transaction contained in it. The recipient of a digital asset only needs to have the private key that is associated with the public key of the recipient of a transaction. The blockchain 161 creates a mathematical proof of ownership by providing an immutable list of transactions that are linked to each other, which makes it impossible to send 1 bitcoin to more than 1 party (double-spend). No participant can double-spend cryptocurrency (i.e., transfer ownership of the same currency to two or more parties). There is no central location where the blockchain is stored. Rather, the blockchain is just stored at the computers, referred to as nodes of a blockchain network, of the participants who choose to store it. Thus, blockchain systems typically implement a distributed ledger, containing all transactions, that is stored redundantly at multiple nodes (i.e., computers) of a blockchain network.

Each node in the blockchain network has a complete replica of the entire blockchain. A blockchain system implements techniques to assist nodes in verifying that their blockchains are identical, even though the nodes may receive invalid or illegal blocks from different parties in the network. To verify that the copy of the blockchain, stored at a node, is correct, the blocks in the blockchain can be accessed from the newest to the oldest comparing the hash of the previous block to that stored in the next block. If the hashes are the same, then the block and the transactions contained in the block are verified since it is nearly impossible to find different block contents that has the same cryptographic hash. Because a hash of the previous block is stored in the next block, it is nearly impossible to change a transaction and regenerate the remaining blockchain. The Bitcoin system is an example of a blockchain system. Other blockchain systems include Ethereum, Litecoin, Ripple, IOTA, Hyperledger, and so on. At the most basic level, a blockchain system supports transactions of its currency known as "coins" or "native" tokens. The native tokens are an integral part of the distributed ledger system providing incentives to the participants to perform tasks required for proper functioning of the blockchain system. Blockchain systems may use different "blockchain protocols" for operation of their distributed ledgers resulting in different advantages and disadvantages.

In embodiments, the computer system 1400 generates a display GUI 400 for displaying the NFT 304 on the display screen. The display GUI 400 is illustrated and described in more detail with reference to FIG. 4. The display GUI 400 is initiable by a display instruction 404 received at the user device 110. The display instruction 404 is illustrated and described in more detail with reference to FIG. 4. The display GUI 400 is configured to generate and transmit SMS messages from the user device 110 to the computer system 1400. The computer system 1400 causes the display GUI 400 to display on the display screen. In embodiments, an SMS message from the user device 110 to the computer system 1400 is a first SMS message. The computer system 1400 interacts with a storage system to store the NFT 304. The NFT 304 is addressed by a URL. The storage system is a peer-to-peer network that stores and shares data in a distributed file system. The computer system 1400 sends a second SMS message describing a record of the signed cryptographic transaction on the blockchain 161 to the phone number of the recipient.

In embodiments, the user device 110 is a first user device, and the display screen is a first display screen. The computer system 1400 generates a mint GUI 300 initiable by a mint instruction 308 received at a second user device including a second display screen. The mint GUI 300 is configured to generate and transmit SMS messages from the second user device to the computer system 1400. The computer system 1400 causes the mint GUI 300 to display on the second display screen for minting digital assets.

Figure 12:
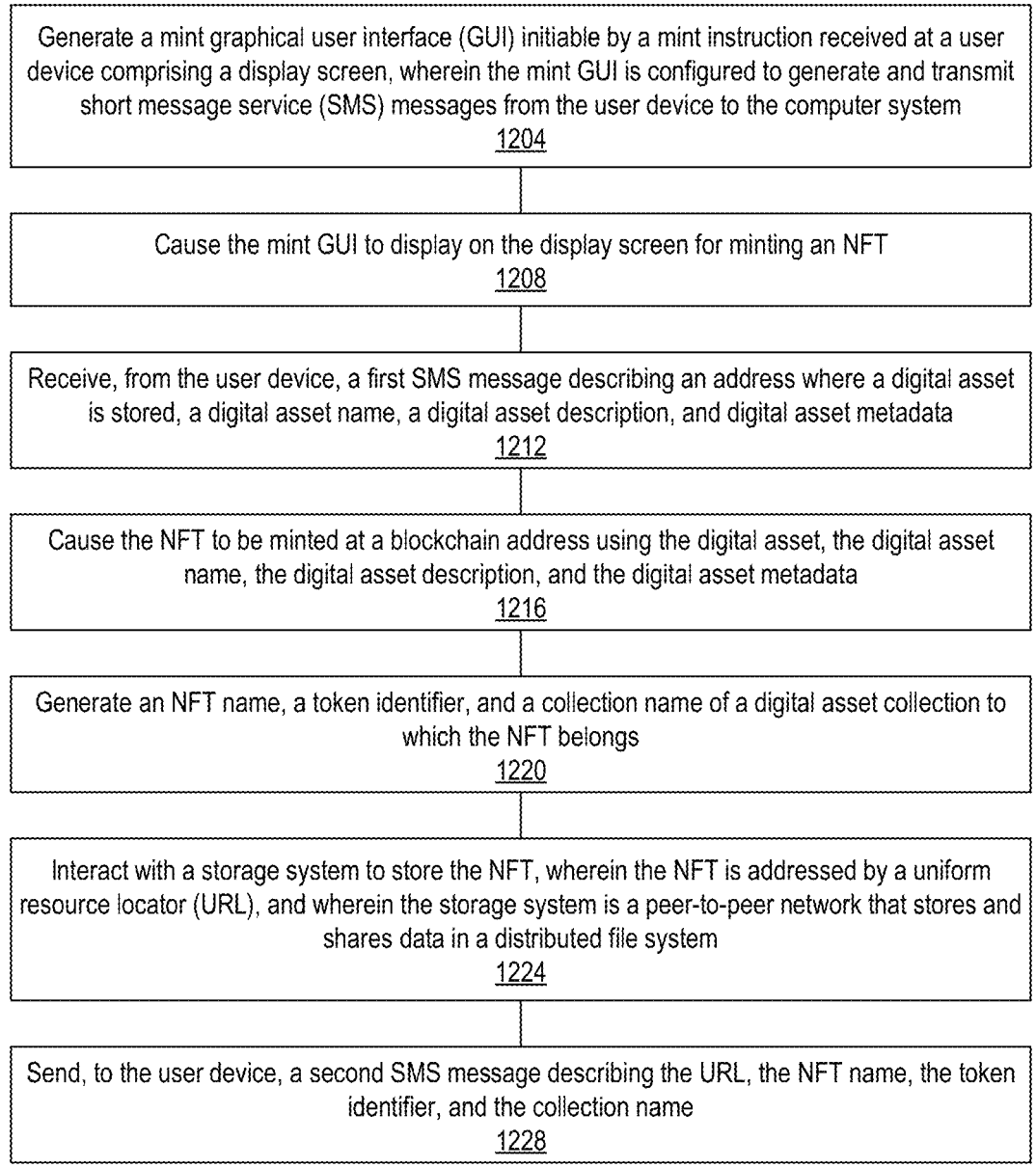
FIG. 12 is a flow diagram illustrating an example process for minting and transfer of NFTs using SMS, in accordance with one or more embodiments.

FIG. 12 is a flow diagram illustrating an example process for minting and transfer of NFTs using SMS, in accordance with one or more embodiments. In some embodiments, the process of FIG. 11 is performed by the system 100 illustrated and described in more detail with reference to FIG. 1. In other embodiments, the process of FIG. 11 is performed by a computer system (e.g., the example computer system 1400 illustrated and described in more detail with reference to FIG. 14). Particular entities, for example, the SMS backend 122, perform some or all of the steps of the process in other embodiments. The SMS backend 122 is illustrated and described in more detail with reference to FIG. 1. Likewise, embodiments can include different and/or additional steps, or perform the steps in different orders.

In step 1204, the computer system 1400 generates a mint GUI 300 initiable by a mint instruction 308 received at a user device 110 including a display screen. The mint GUI 300 and mint instruction 308 are illustrated and described in more detail with reference to FIG. 3. The user device 110 is illustrated and described in more detail with reference to FIG. 1. The mint GUI 300 is configured to generate and transmit SMS messages from the user device 110 to the computer system 1400.

In step 1208, the computer system 1400 causes the mint GUI 300 to display on the display screen for minting an NFT 304. The NFT 304 is illustrated and described in more detail with reference to FIG. 3. In step 1212, the computer system 1400 receives, from the user device 110, SMS messages or a first SMS message describing an address where a digital asset is stored, a digital asset name 312, a digital asset description 316, and digital asset metadata. The digital asset name 312 and digital asset description 316 are illustrated and described in more detail with reference to FIG. 3.

In step 1216, the computer system 1400 causes the NFT 304 to be minted at a blockchain address using the digital asset, the digital asset name 312, the digital asset description 316, and the digital asset metadata.

In step 1220, the computer system 1400 generates an NFT name, a token identifier, and a collection name of a digital asset collection to which the NFT 304 belongs. The NFT name can be the same as the digital asset name 312.

In step 1224, the computer system 1400 interacts with a storage system to store the NFT 304. The NFT 304 is addressed by a URL. The storage system is a peer-to-peer network that stores and shares data in a distributed file system.

In step 1228, the computer system 1400 sends, to the user device 110, SMS messages or a second SMS message describing the URL, the NFT name, the token identifier, and the collection name. In embodiments, the user device 110 is a first user device, and the display screen is a first display screen. A display GUI 400 is generated for displaying the NFT 304 on a second display screen of a second user device. The display GUI 400 is illustrated and described in more detail with reference to FIG. 4. The display GUI 400 is initiable by a display instruction 404 received at the second user device. The display GUI 400 is configured to generate and transmit SMS messages from the second user device to the computer system 1400. The display GUI 400 is caused to display on the second display screen for searching for the NFT 304.

In embodiments, responsive to receiving, from the second user device, SMS messages or a third SMS message describing the NFT name and the collection name, the NFT 304 is located in the digital asset collection based on the third SMS message. The NFT 304 is retrieved from the blockchain address using the URL. In embodiments, responsive to receiving, from the second user device, a third SMS message describing the token identifier and the collection name: the computer system 1400 interacts with a smart contract corresponding to the digital asset collection based on the third SMS message. Responsive to interacting with the smart contract, the digital asset metadata is received from the smart contract. The NFT 304 is retrieved from the blockchain address using the digital asset metadata. A preview of the NFT 304 and an NFT owner 408 is displayed using the display GUI 400. The NFT owner 408 is illustrated and described in more detail with reference to FIG. 4.

In embodiments, the user device 110 is a first user device, and the display screen is a first display screen. A transfer GUI 500 initiable by a transfer instruction 508 is received at a second user device including a second display screen. The transfer GUI 500 is configured to generate and transmit SMS messages from the second user device to the computer system 1400. The transfer GUI 500 is caused to display on the second display screen for transferring the NFT 304 to a recipient. In embodiments, responsive to receiving, from the second user device, SMS messages or a third SMS message describing the token identifier, the collection name, a recipient blockchain address, and a phone number of the recipient: the computer system 1400 resolves the collection name to a collection blockchain address based on the third SMS message. A cryptographic operation (e.g., a transaction) is generated on a blockchain to transfer the NFT 304 from the collection blockchain address to the recipient blockchain address.

In embodiments, a request is sent to an HSM 130 communicably coupled to the blockchain 161 to cryptographically sign a hash of the cryptographic transaction using a private key associated with the phone number of the recipient. The signed cryptographic transaction is recorded on the blockchain.

Figure 13:
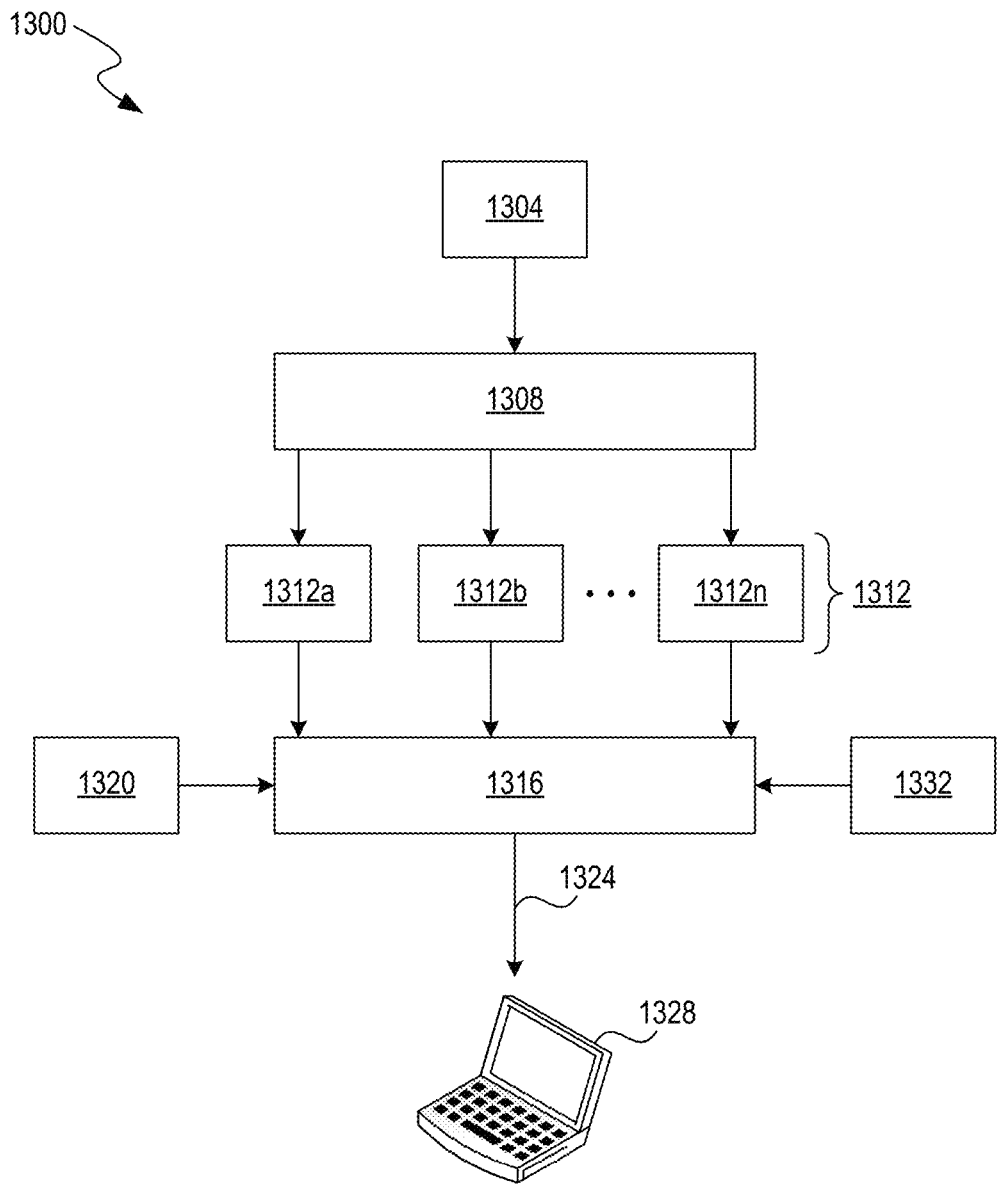
FIG. 13 is a block diagram illustrating an example machine learning (ML) system, in accordance with one or more embodiments.

FIG. 13 is a block diagram illustrating an example ML system 1300, in accordance with one or more embodiments. The ML system 1300 is implemented using components of the example computer system 300 illustrated and described in more detail with reference to FIG. 3. For example, the ML system 1300 can be implemented on the console 108 using instructions programmed in the memory 164 illustrated and described in more detail with reference to FIG. 1. Likewise, embodiments of the ML system 1300 can include different and/or additional components or be connected in different ways. The ML system 1300 is sometimes referred to as an ML module.

The ML system 1300 includes a feature extraction module 1308 implemented using components of the example computer system 300 illustrated and described in more detail with reference to FIG. 3. In some embodiments, the feature extraction module 1308 extracts a feature vector 1312 from input data 1304. For example, the input data 1304 can include SMS messages illustrated and described in more detail with reference to FIG. 1. The feature vector 1312 includes features 1312*a*, 1312*b*, . . . , 1312*n*. The feature extraction module 1308 reduces the redundancy in the input data 1304 (e.g., repetitive data values), to transform the input data 1304 into the reduced set of features 1312 (e.g., features 1312*a*), 1312*b*, . . . , 1312*n*. The feature vector 1312 contains the relevant information from the input data 1304, such that events or data value thresholds of interest can be identified by the ML model 1316 by using a reduced representation. In some example embodiments, the following dimensionality reduction techniques are used by the feature extraction module 1308: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 1316 performs deep learning (also known as deep structured learning or hierarchical learning) directly on the input data 1304 to learn data representations, as opposed to using task-specific algorithms. In deep learning, no explicit feature extraction is performed; the features 1312 are implicitly extracted by the ML system 1300. For example, the ML model 1316 can use a cascade of multiple layers of nonlinear processing units for implicit feature extraction and transformation. Each successive layer uses the output from the previous layer as input. The ML model 1316 can thus learn in supervised (e.g., classification) and/or unsupervised (e.g., pattern analysis) modes. The ML model 1316 can learn multiple levels of representations that correspond to different levels of abstraction, wherein the different levels form a hierarchy of concepts. The ML model 1316 can be configured to differentiate features of interest from background features.

In alternative example embodiments, the ML model 1316 (e.g., in the form of a CNN) generates the output 1324, without the need for feature extraction, directly from the input data 1304. The output 1324 is provided to the computer device 1328 or the console 108 illustrated and described in more detail with reference to FIG. 1. The computer device 1328 is a server, computer, tablet, smartphone, smart speaker, etc., implemented using components of the example computer system 300 illustrated and described in more detail with reference to FIG. 3. In some embodiments, the steps performed by the ML system 1300 are stored in memory on the computer device 1328 for execution. In other embodiments, the output 1324 is displayed on the user device 110 illustrated and described in more detail with reference to FIG. 1.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 1316 can be a CNN that includes both convolutional layers and max pooling layers. The architecture of the ML model 1316 can be "fully convolutional," which means that variable sized sensor data vectors can be fed into it. For all convolutional layers, the ML model 1316 can specify a kernel size, a stride of the convolution, and an amount of zero padding applied to the input of that layer. For the pooling layers, the model 1316 can specify the kernel size and stride of the pooling.

In some embodiments, the ML system 1300 trains the ML model 1316, based on the training data 1320, to correlate the feature vector 1312 to expected outputs in the training data 1320. As part of the training of the ML model 1316, the ML system 1300 forms a training set of features and training labels by identifying a positive training set of features that have been determined to have a desired property in question, and, in some embodiments, forms a negative training set of features that lack the property in question.

The ML system 1300 applies ML techniques to train the ML model 1316, that when applied to the feature vector 1312, outputs indications of whether the feature vector 1312 has an associated desired property or properties, such as a probability that the feature vector 1312 has a particular Boolean property, or an estimated value of a scalar property. The ML system 1300 can further apply dimensionality reduction (e.g., via linear discriminant analysis (LDA, PCA, or the like) to reduce the amount of data in the feature vector 1312 to a smaller, more representative set of data.

The ML system 1300 can use supervised ML to train the ML model 1316, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 232 is formed of additional features, other than those in the training data 1320, which have already been determined to have or to lack the property in question. The ML system 1300 applies the trained ML model 1316 to the features of the validation set 232 to quantify the accuracy of the ML model 1316. Common metrics applied in accuracy measurement include: Precision and Recall, where Precision refers to a number of results the ML model 1316 correctly predicted out of the total it predicted, and Recall is a number of results the ML model 1316 correctly predicted out of the total number of features that had the desired property in question. In some embodiments, the ML system 1300 iteratively re-trains the ML model 1316 until the occurrence of a stopping condition, such as the accuracy measurement indication that the ML model 1316 is sufficiently accurate, or a number of training rounds having taken place.

Figure 14:
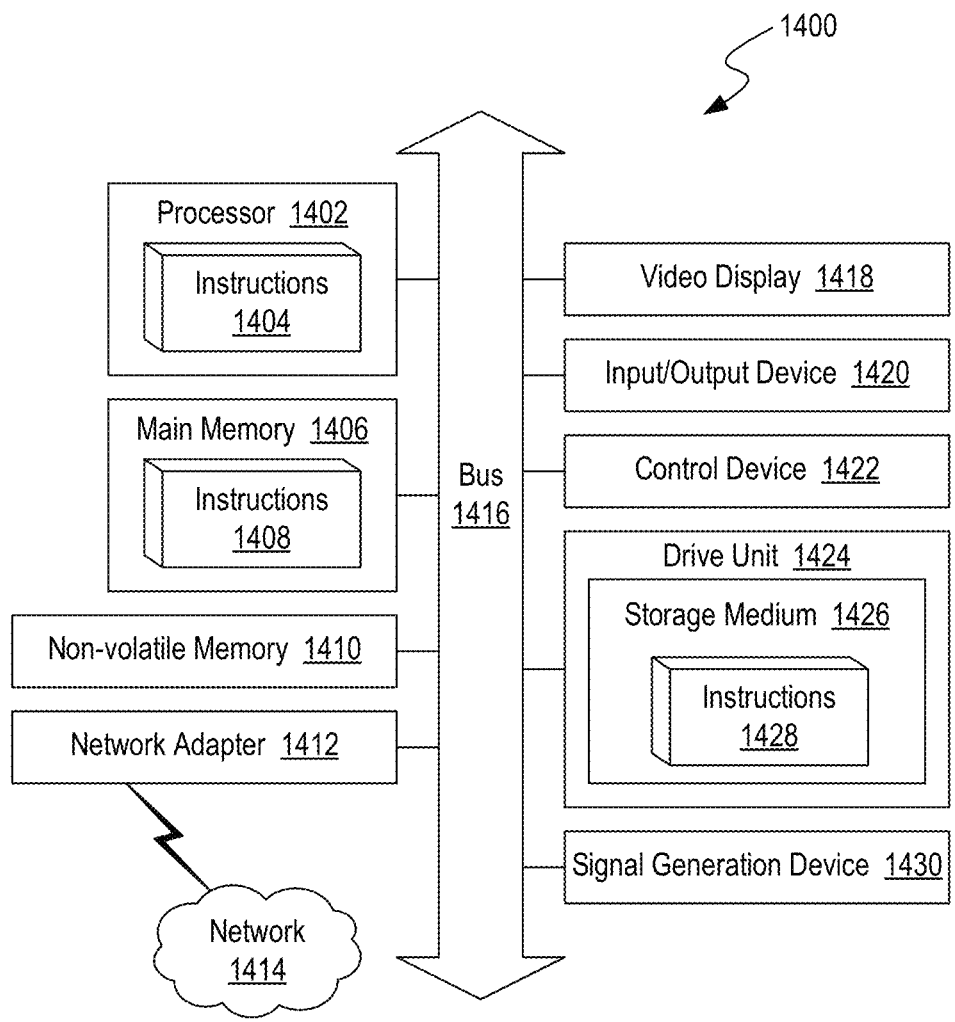
FIG. 14 is a block diagram illustrating an example computer system, in accordance with one or more embodiments.

FIG. 14 is a block diagram illustrating an example computer system, in accordance with one or more embodiments. Components of the example computer system 1400 can be used to implement the system 100 illustrated and described in more detail with reference to FIG. 1. In some embodiments, components of the example computer system 1400 are used to implement the ML system 1300 illustrated and described in more detail with reference to FIG. 2. At least some operations described herein can be implemented on the computer system 1400.

The computer system 1400 can include one or more central processing units ("processors") 1402, main memory 1406, non-volatile memory 1410, network adapters 1412 (e.g., network interface), video displays 1418, input/output devices 1420, control devices 1422 (e.g., keyboard and pointing devices), drive units 1424 including a storage medium 1426, and a signal generation device 1420 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1400 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the computer system 1400.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1404, 1408, 1428) set at various times in various memory and storage devices in a computer device. When read and executed by the one or more processors 1402, the instruction(s) cause the computer system 1400 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media, such as volatile and non-volatile memory devices 1410, floppy and other removable disks, hard disk drives, optical discs (e.g., Compact Disc Read-Only Memory (CD-ROMS), Digital Versatile Discs (DVDs)), and transmission-type media, such as digital and analog communication links.

The network adapter 1412 enables the computer system 1400 to mediate data in a network 1414 with an entity that is external to the computer system 1400 through any communication protocol supported by the computer system 1400 and the external entity. The network adapter 1412 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1412 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions, including the access and operation rights of an object by an individual, a machine, and/or an application, and the circumstances under which the permission rights stand.

The systems disclosed herein can also determine whether to train an ML model. The further training increases accuracy. For example, if a confidence score for a trained ML model is below a threshold value, the system can determine a training protocol to further train the ML system or transition to a different ML system. In some training protocols, the system identifies a training database based on the patient data. The system can train the ML model using matched training data.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

What is claimed is:

1. A computer-implemented method for digital communication using cryptography, comprising:
   generating, by a computer system, a transfer graphical user interface (GUI) initiable by a transfer instruction received at a user device comprising a display screen, wherein the transfer GUI is configured to generate and transmit short message service (SMS) messages from the user device to the computer system;
   causing, by the computer system, the transfer GUI to display on the display screen for transferring a non-fungible token (NFT) to a recipient;
   responsive to receiving, from the user device, an SMS message, the SMS message describing an NFT token identifier, a collection name of a digital asset collection to which the NFT belongs, a recipient blockchain address, and a recipient phone number:
      resolving, by the computer system, the collection name to a collection blockchain address based on the SMS message; and
      determining, by the computer system, that an amount of cryptocurrency referenced by the recipient blockchain address is greater than or equal to a threshold amount corresponding to the NFT;
   responsive to determining that the amount of cryptocurrency is greater than or equal to the threshold amount, generating, by the computer system, a cryptographic operation on a blockchain to transfer the NFT from the collection blockchain address to the recipient blockchain address;
   sending, by the computer system, a request to a hardware security module (HSM) communicably coupled to the blockchain to cryptographically sign a hash of the cryptographic operation using a private key associated with the phone number of the recipient; and
   recording, by the computer system, the cryptographic operation on the blockchain.

2. The method of claim 1, wherein the SMS message describes an NFT name, an NFT description, and NFT metadata, the method comprising:
   determining, by the computer system, that the NFT has been minted by analyzing the SMS message; and
   retrieving, by the computer system, the NFT from the collection blockchain address.

3. The method of claim 1, comprising:
   generating, by the computer system, a display GUI for displaying the NFT on the display screen, wherein the display GUI is initiable by a display instruction received at the user device, and wherein the display GUI is configured to generate and transmit the SMS messages from the user device to the computer system; and
   causing, by the computer system, the display GUI to display on the display screen.

4. The method of claim 1, wherein the SMS message is a first SMS message, the method comprising:
   interacting, by the computer system, with a storage system to store the NFT, wherein the NFT is addressed by a uniform resource locator (URL), and wherein the storage system is a peer-to-peer network that stores and shares data in a distributed file system; and
   sending, by the computer system, a second SMS message describing a record of the cryptographic operation on the blockchain to the phone number of the recipient.

5. The method of claim 1, wherein the cryptographic operation references an NFT owner,
   the NFT token identifier is associated with metadata comprising a URL pointing to the NFT, and
   the NFT token identifier is specified in a data interchange format that uses human-readable text to store and transmit data objects consisting of attribute-value pairs and arrays.

6. The method of claim 1, wherein the SMS message is a first SMS message, the method comprising:
   transmitting, by the computer system, the NFT token identifier to a website for indexing and tracking the NFT; and
   sending, by the computer system, a second SMS message, to the phone number of the recipient, describing a URL pointing to a location on the website referencing the NFT.

7. The method of claim 1, wherein the user device is a first user device, and the display screen is a first display screen, the method comprising:
   generating, by the computer system, a mint GUI initiable by a mint instruction received at a second user device comprising a second display screen, wherein the mint GUI is configured to generate and transmit a second SMS message from the second user device to the computer system; and causing, by the computer system, the mint GUI to display on the second display screen for minting the NFT.

8. A computer-implemented method for digital communication using cryptography, comprising:

generating a mint graphical user interface (GUI) initiable by a mint instruction received at a first user device comprising a first display screen, wherein the mint GUI is configured to generate and transmit short message service (SMS) messages from the first user device to a computer system;

causing the mint GUI to display on the first display screen for minting an NFT;

responsive to receiving, from the first user device, a first SMS message, the first SMS message describing an address where a digital asset is stored, a digital asset name, a digital asset description, and digital asset metadata:
- causing the NFT to be minted at a blockchain address using the digital asset, the digital asset name, the digital asset description, and the digital asset metadata; and
- generating an NFT name, an NFT token identifier, and a collection name of a digital asset collection to which the NFT belongs;

interacting with a storage system to store the NFT, wherein the NFT is addressed by a uniform resource locator (URL), and wherein the storage system is a peer-to-peer network that stores and shares data in a distributed file system;

sending, to the first user device, a second SMS message, the second SMS message describing the URL, the NFT name, the NFT token identifier, and the collection name;

generating a transfer GUI initiable by a transfer instruction received at a second user device comprising a second display screen, wherein the transfer GUI is configured to generate and transmit a third SMS message from the second user device to the computer system;

causing the transfer GUI to display on the second display screen for transferring the NFT to a recipient; and responsive to receiving, from the second user device, the third SMS message, the third SMS message describing the NFT token identifier, the collection name, a recipient blockchain address, and a phone number of the recipient:
- resolving the collection name to a collection blockchain address based on the third SMS message; and
- generating a cryptographic operation on a blockchain to transfer the NFT from the collection blockchain address to the recipient blockchain address.

9. The method of claim 8, comprising:

generating a display GUI for displaying the NFT on the second display screen of the second user device, wherein the display GUI is initiable by a display instruction received at the second user device, and wherein the display GUI is configured to generate and transmit a fourth SMS message from the second user device to the computer system; and causing the display GUI to display on the second display screen for searching for the NFT.

10. The method of claim 9, comprising:

responsive to receiving, from the second user device, the fourth SMS message, the fourth SMS message describing the NFT name and the collection name:
- locating the NFT in the digital asset collection based on the fourth third SMS message; and
- retrieving the NFT from the blockchain address using the URL.

11. The method of claim 9, comprising:

responsive to receiving, from the second user device, the fourth SMS message, the fourth SMS message describing the NFT token identifier and the collection name:
- interacting with a smart contract corresponding to the digital asset collection based on the fourth third SMS message;
- responsive to interacting with the smart contract, receiving the digital asset metadata from the smart contract;
- retrieving the NFT from the blockchain address using the digital asset metadata; and
- displaying a preview of the NFT and an NFT owner using the display GUI.

12. The method of claim 8, further comprising:

sending a request to a hardware security module (HSM) communicably coupled to the blockchain to cryptographically sign a hash of the cryptographic operation using a private key associated with the phone number of the recipient; and recording the cryptographic operation on the blockchain.

13. A computer system for digital communication using cryptography, comprising:

one or more computer processors; and a non-transitory computer-readable storage medium storing computer instructions, which when executed by the one or more computer processors cause the system to:
- generate a mint graphical user interface (GUI) initiable by a mint instruction received at a first user device comprising a first display screen, wherein the mint GUI is configured to generate and transmit short message service (SMS) messages from the first user device to the computer system;
- cause the mint GUI to display on the first display screen for minting an NFT;
- responsive to receiving, from the first user device, a first SMS message, the first SMS message describing an address where a digital asset is stored, a digital asset name, a digital asset description, and digital asset metadata:
  - cause the NFT to be minted at a blockchain address using the digital asset, the digital asset name, the digital asset description, and the digital asset metadata; and
  - generate an NFT name, an NFT token identifier, and a collection name of a digital asset collection to which the NFT belongs;
- interact with a storage system to store the NFT, wherein the NFT is addressed by a uniform resource locator (URL), and wherein the storage system is a peer-to-peer network that stores and shares data in a distributed file system; and
- send, to the first user device, a second SMS message, the second SMS message describing the URL, the NFT name, the NFT token identifier, and the collection name;
- generate a transfer GUI initiable by a transfer instruction received at a second user device comprising a second display screen, wherein the transfer GUI is configured to generate and transmit a third SMS message from the second user device to the computer system;
cause the transfer GUI to display on the second display screen for transferring the NFT to a recipient; and
responsive to receiving, from the second user device, the third SMS message, the third SMS message describing the NFT token identifier, the collection name, a recipient blockchain address, and a phone number of the recipient:
resolve the collection name to a collection blockchain address based on the third SMS message; and
generate a cryptographic operation on a blockchain to transfer the NFT from the collection blockchain address to the recipient blockchain address.

14. The computer system of claim 13, wherein the computer instructions cause the system to:
generate a display GUI for displaying the NFT on the second display screen of the second user device, wherein the display GUI is initiable by a display instruction received at the second user device, and wherein the display GUI is configured to generate and transmit a fourth SMS message from the second user device to the computer system; and
cause the display GUI to display on the second display screen for searching for the NFT.

15. The computer system of claim 14, wherein the computer instructions cause the computer system to:
responsive to receiving, from the second user device, the fourth SMS message, the fourth SMS message describing the NFT name and the collection name:
locate the NFT in the digital asset collection based on the fourth SMS message; and
retrieve the NFT from the blockchain address using the URL.

16. The computer system of claim 14, wherein the computer instructions cause the computer system to:
responsive to receiving, from the second user device, the fourth SMS message, the fourth SMS message describing the NFT token identifier and the collection name:
interact with a smart contract corresponding to the digital asset collection based on the fourth SMS message; and
responsive to interacting with the smart contract, receive the digital asset metadata from the smart contract;
retrieve the NFT from the blockchain address using the digital asset metadata; and
display a preview of the NFT and an NFT owner using the display GUI.

* * * * *